(12) United States Patent
Svennebring et al.

(10) Patent No.: US 11,641,608 B2
(45) Date of Patent: *May 2, 2023

(54) SOFTWARE-DEFINED NETWORKING DATA RE-DIRECTION

(71) Applicant: Intel Corporation, Santa Clara, CA (US)

(72) Inventors: Jonas Svennebring, Sollentuna (SE); Niall D. McDonnell, Limerick (IE); Andrey Chilikin, Limerick (IE); Andrew Cunningham, Ennis (IE); Christopher MacNamara, Limerick (IE); Carl-Oscar Montelius, Sollentuna (SE); Eliezer Tamir, Bait Shemesh (IL); Bjorn Topel, Järfälla (SE)

(73) Assignee: Intel Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/184,832

(22) Filed: Feb. 25, 2021

(65) Prior Publication Data

US 2021/0385720 A1 Dec. 9, 2021

Related U.S. Application Data

(63) Continuation of application No. 16/147,220, filed on Sep. 28, 2018, now Pat. No. 10,966,135.

(51) Int. Cl.
*H04W 36/30* (2009.01)
*H04W 36/32* (2009.01)
(Continued)

(52) U.S. Cl.
CPC ............ *H04W 36/30* (2013.01); *H04L 45/42* (2013.01); *H04L 45/64* (2013.01); *H04W 36/32* (2013.01);
(Continued)

(58) Field of Classification Search
None
See application file for complete search history.

(56) References Cited

U.S. PATENT DOCUMENTS

| 10,966,135 B2 | 3/2021 | Svennebring et al. |
| 2006/0101157 A1* | 5/2006 | Eardley ................... H04L 45/24 709/239 |

(Continued)

OTHER PUBLICATIONS

"U.S. Appl. No. 16/147,220, Advisory Action dated May 1, 2020", 4 pgs.

(Continued)

*Primary Examiner* — Saad Khawar
(74) *Attorney, Agent, or Firm* — Schwegman Lundberg & Woessner, P.A.

(57) ABSTRACT

Aspects of data re-direction are described, which can include software-defined networking (SDN) data re-direction operations. Some aspects include data re-direction operations performed by one or more virtualized network functions. In some aspects, a network router decodes an indication of a handover of a user equipment (UE) from a first end point (EP) to a second EP, based on the indication, the router can update a relocation table including the UE identifier, an identifier of the first EP, and an identifier of the second EP. The router can receive a data packet for the UE, configured for transmission to the first EP, and modify the data packet, based on the relocation table, for rerouting to the second EP. In some aspects, the router can decode handover prediction information, including an indication of a predicted future geographic location of the UE, and update the relocation table based on the handover prediction information.

21 Claims, 24 Drawing Sheets

(51) Int. Cl.

| | |
|---|---|
| *H04L 45/64* | (2022.01) |
| *H04W 76/27* | (2018.01) |
| *H04L 45/42* | (2022.01) |
| *H04W 40/18* | (2009.01) |
| *H04W 36/00* | (2009.01) |
| *H04W 24/10* | (2009.01) |
| *H04L 45/00* | (2022.01) |
| *H04L 45/74* | (2022.01) |

(52) U.S. Cl.
CPC ........... *H04W 40/18* (2013.01); *H04W 76/27* (2018.02); *H04L 45/54* (2013.01); *H04L 45/74* (2013.01); *H04W 24/10* (2013.01); *H04W 36/0085* (2018.08)

(56) References Cited

U.S. PATENT DOCUMENTS

| | | | | |
|---|---|---|---|---|
| 2007/0274268 | A1* | 11/2007 | Axelsson | H04W 40/18 370/338 |
| 2015/0304913 | A1 | 10/2015 | Uusitalo et al. | |
| 2016/0234738 | A1* | 8/2016 | Yan | H04W 40/02 |
| 2016/0323715 | A1* | 11/2016 | Leroux | H04W 4/029 |
| 2018/0270721 | A1* | 9/2018 | Cui | H04L 5/001 |
| 2018/0337862 | A1 | 11/2018 | Sharma et al. | |
| 2019/0104458 | A1 | 4/2019 | Svennebring et al. | |
| 2019/0289505 | A1* | 9/2019 | Thomas | H04W 68/02 |

OTHER PUBLICATIONS

"U.S. Appl. No. 16/147,220, Examiner Interview Summary dated Apr. 6, 2020", 3 pgs.

"U.S. Appl. No. 16/147,220, Final Office Action dated Feb. 18, 2020", 26 pgs.

"U.S. Appl. No. 16/147,220, Non Final Office Action dated Sep. 18, 2019", 23 pgs.

"U.S. Appl. No. 16/147,220, Notice of Allowance dated Nov. 25, 2020", 9 pgs.

"U.S. Appl. No. 16/147,220, Response filed Jan. 15, 2020 to Non Final Office Action dated Sep. 18, 2019", 11 pgs.

"U.S. Appl. No. 16/147,220, Response filed Apr. 17, 2020 to Final Office Action dated Feb. 18, 2020", 11 pgs.

"U.S. Appl. No. 16/147,220, Response filed May 8, 2020 to Advisory Action dated May 1, 2020", 12 pgs.

* cited by examiner

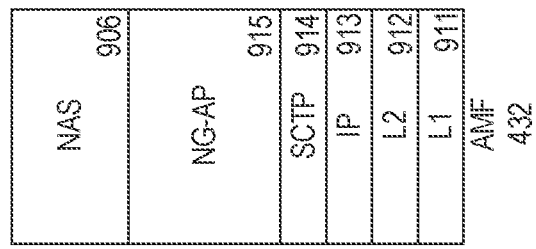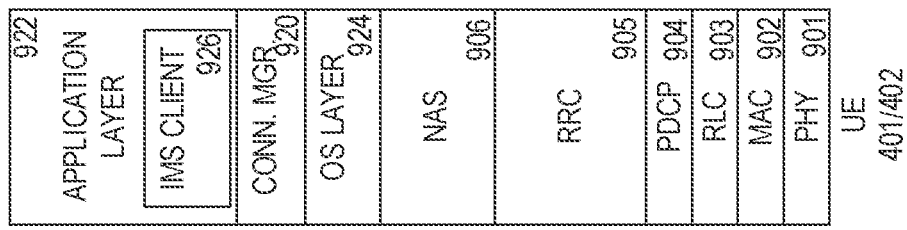
FIG. 9

SOFTWARE-DEFINED NETWORKING DATA RE-DIRECTION

This application is a continuation of U.S. patent application Ser. No. 16/147,220, filed Sep. 28, 2018, which is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, wireless local area networks (WLANs), fifth-generation (5G) networks including 5G new radio (NR) networks, next-generation (NG) networks, 5G-LTE networks, and software-defined networks (SDNs). Other aspects are directed to solutions for data re-direction in SDNs.

BACKGROUND

In wireless networks, a client often requests data while moving in between geographic regions that are serviced by different infrastructure end points. In such cases, network entities may respond to the data requests by sending data transmissions to incorrect end points. For example, if a client has moved since requesting data, the network entity may incorrectly send the data transmission to the client's previous location. Re-requesting data transmissions after an endpoint timeout or forwarding to a new endpoint location can have performance and quality implications, adding latency and bandwidth cost to the network. For example, measurements at service providers have shown that as much as 50% of interface data can comprise forwarding traffic to handle client endpoint switches. A solution is needed for addressing this problem without requiring substantial changes to the standards.

BRIEF DESCRIPTION OF THE DRAWINGS

FIG. 4I illustrates an example roaming architecture for SCEF in accordance with some aspects;

FIG. 9 is an illustration of an exemplary control plane protocol stack in accordance with some aspects;

DESCRIPTION OF ASPECTS

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
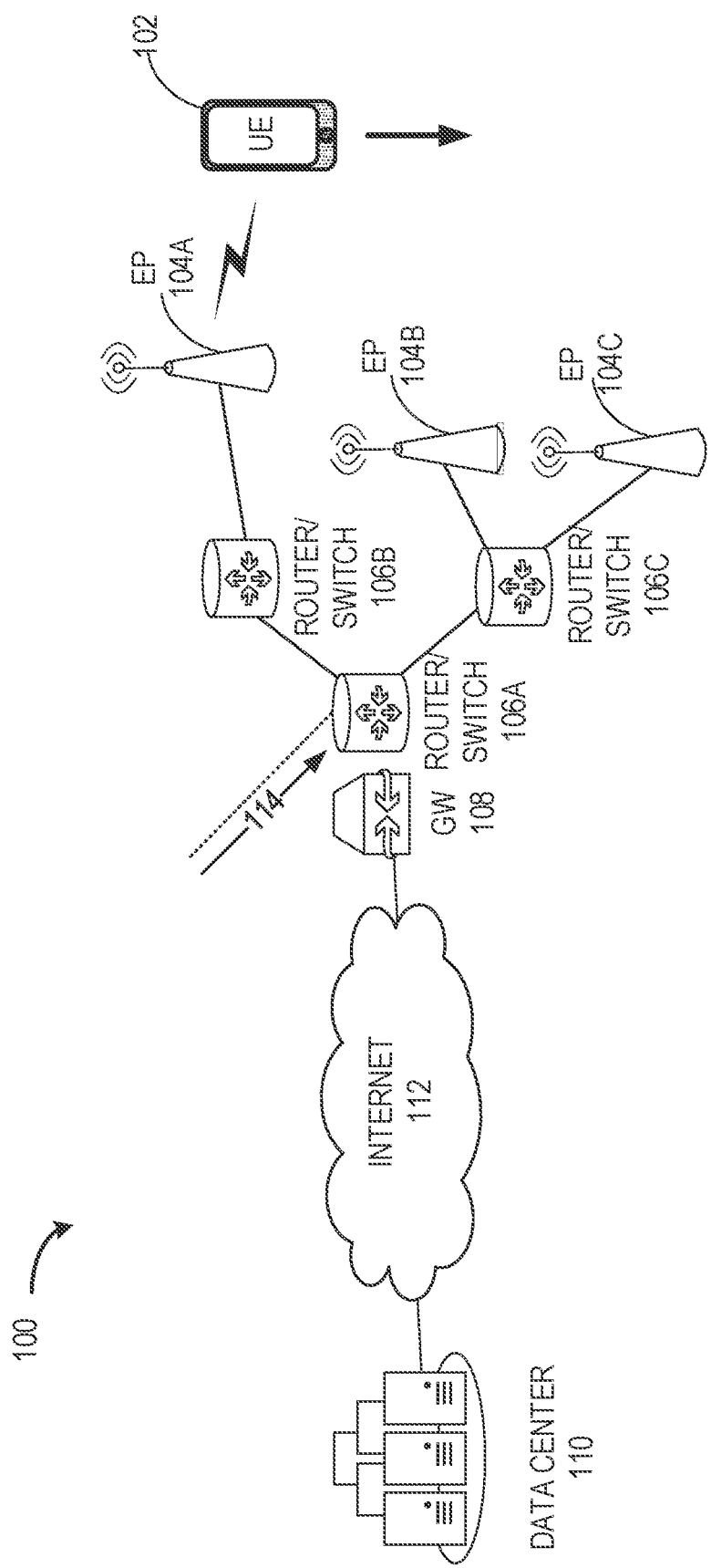
FIG. 1 illustrates an exemplary architecture of a system of a network, in accordance with some aspects.

FIG. 1 illustrates an architecture of a system 100 of a network, in accordance with some aspects. System 100 can be configured for software-defined networking (SDN) or network function virtualization (NFV), configured as an SDN network, and can include an SDN or NFV infrastructure. In some aspects, system 100 can be configured to include virtualized network functions for performing data re-direction (e.g., SDN data re-direction). System 100 can also be a distributed network, including a decentralized and static architecture of network entities that are configured to perform data re-direction.

From a global view of a network state, system 100 (e.g., configured for SDN) can control network flows of the network in a programmatic and centralized manner. A core principle of SDN is the separation of control plane software from the packet-forwarding data plane, as opposed to control plane software being distributed across all data plane devices in the network. In some aspects, network forwarding, and other networking functions can be virtualized for implementation across devices of the system 100 (e.g., configured for NFV).

The system 100 may be similar to, or part of, the systems 400A and 400B of FIGS. 4A and 4B, as described further below. System 100 can include end points (EPs) (e.g., 104A-104C) that may be base stations (BSs), access nodes (ANs) or access points (APs) configured to enable wired or wireless connections (e.g., communicative coupling) to wired or wireless communication devices, such as client devices. Client devices can be mobile and can include, for example, user equipment (UE) 102, vehicular devices, aerial devices (e.g., drones), and client devices (e.g., UE) within such vehicular and aerial devices. The system 100 can include network routing apparatuses, network routers or network switches (e.g., 106A-106C) configured for forwarding data packets between devices or networks, and performing traffic directing functions, for example, re-directing data. The gateway 108 can be configured to facilitate data flow from one discrete network to another network and can communicate using more than one protocol. In some aspects, the gateway 108 can receive data flow (e.g., data packets) from a data source and provide the data flow to a router or switch. For example, the gateway 108 can receive data packets, transmitted from a data center 110 over the internet 112, and can forward the data packets to the router 106A.

In some aspects, for instance in an SDN or NFV configured system 100, any one or more of the routers 106A-C, switches 106A-C, controllers, gateways 108, EPs 104A-C, BSs, ANs or APs, or other network components not shown in FIG. 1, can be virtualized for implementing the data re-direction operations described herein. The system 100 can include an Internet of Things (IoT) network topology comprising communication links adapted to perform communications for the data re-direction operations described herein. In some aspects, the system 100 can include an edge cloud computing device implementation comprising processing nodes or computing units adapted to perform the data re-direction operations described herein. The system 100 can include an edge cloud network platform comprising physical or logical computing resources adapted for performing the data re-direction operations described herein. In certain aspects, the system 100 can include apparatuses (e.g., of devices) that comprise means for performing the data re-direction operations.

As an SDN network, the system 100 can provide a collection of virtualized services that perform functions or operations that are similar to, or the same as, functions performed by a decentralized and static architecture (e.g., in a traditional network). In some aspects, SDN can be executed on NFV infrastructure (e.g., as shown in FIG. 5C), including data forwarding and re-directing between devices of system 100, while SDN control functions (e.g., routing and policy defining) and control functions particular to data re-direction can exist in the SDN domain (e.g., SDN servers). In certain aspects, configuration of the data re-direction operations described herein can be programmatically defined and modified through SDN or NFV.

In certain aspects, the UE 102 may request data while moving in between geographic regions that are serviced by different EPs (e.g., BSs, APs). For example, the UE 102 may be travelling in the direction shown in FIG. 1, moving from a coverage area of EP 104A to coverage area of EP 104B. While the EP 104A is servicing the UE 102, the UE 102 may request data packets, for example, by transmitting a data request message to a network entity (e.g., data center 110). However, since the time of transmitting the data packet request message, the UE 102 may have traveled outside of the coverage area in which the UE 102 made the request, for example, outside of the coverage area of EP 104A and into the coverage area of EP 104B. In such aspects, the UE 102 may not be available to receive the responding data packets from EP 104A. In this case, data packets may incorrectly arrive at EP 104A. In such cases, re-requesting data transmissions or forwarding data transmissions to a new location (e.g., at EP 104B) can result in longer response times and performance and quality degradation.

To address this, the system 100 can use data re-direction operations. In some aspects, data re-direction operations and include SDN-based or NFV-based packet processing operations, including re-directing identified packet flows in a centralized radio access network (RAN) (e.g., RAN 410, 436). For example, client UEs that have been handed over, are about to be handed over, or are in the process of being handed over to an EP (e.g., AP, BS) from a current EP can have their previous EP location and a new EP location added to a relocation table (e.g., relocation table in the SDN domain). The SDN relocation table can be a short-lived SDN relocation table, including EP location entries that are stored in the table for only a short period of time, similar to a cache. Handover identification can come from different network entities, such as RAN nodes (e.g., EP, AP, BS, eNB, gNB), a Mobility Management Entity (MME), an access and mobility management function (AMF), a user plane function (UPF), or a Global Positioning Satellite (GPS) device, using GPS navigation software for path tracking information services. In some aspects, handover identification can also come from a UE.

The system 100 can also use handover prediction information 114, in some aspects, to make a decision of where to re-direct data packets for the UE 102, as described further below. Handover prediction information 114 can come from (e.g., transmitted in signaling from) different network entities, such as a link quality prediction (LQP) server, MME or AMF, RAN nodes such as APs/BSs, or even from a wireless device such as a UE (e.g., UE 102). In some aspects, as described further below, the router or switch 106A can store the short-lived SDN relocation table in memory, or the SDN relocation table can be stored in the SDN domain. When receiving a data packet for the UE 102, the router 106A can refer to the SDN relocation table and determine whether the UE 102 has moved to a new (e.g., EP) location.

If the UE 102 has moved from a previous EP location (e.g., EP 104A), where the data packet was requested, to a new EP location (e.g., EP 104B), the router 106A can re-direct the data packet to avoid the UE 102 needing to re-request data, or to avoid forwarding the data packet (e.g., from the previous location 104A). In some aspects, the router 106A may re-direct the data packet to a second router (e.g., router 106C), and the second router may forward the data packet to the appropriate EP location (e.g., EP 104B, EP 104C). In certain aspects, data packet transmissions can be duplicated, for example, when it is unclear what path will yield the fastest response for delivering the data packet to the appropriate location of the UE 102. In such aspects, the router 106A can transmit the data packet to multiple EP locations (e.g., EP 104B and EP 104C).

Figure 2:
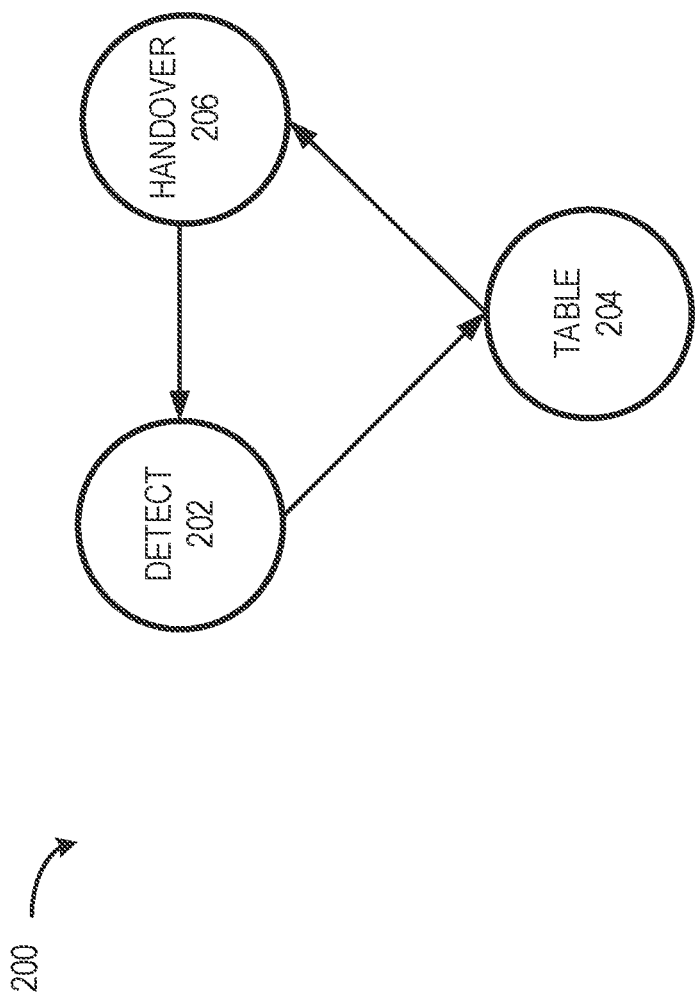
FIG. 2 is a state diagram illustrating exemplary states of an SDN data re-direction operation, in accordance with some aspects.

FIG. 2 is a state diagram illustrating states 200 of an SDN data re-direction operation, in accordance with certain aspects. For example, the states 200 shown in FIG. 2 can represent operations to be performed by one or more network entities (e.g., virtualized functions) of FIG. 1, FIG. 3, or FIGS. 4A-13. In some aspects, the states 200 shown in FIG. 2 correspond to one or more functions of an SDN or NFV system (e.g., virtualized functions), such as SDN architectures 500A/500B in FIG. 5A-5B, or NFV architecture 500C, described in greater detail below.

The states 200 associated with SDN data re-direction operations shown in FIG. 2 may not necessarily occur in the order shown. In some aspects, knowledge about the UE 102 and the UE's environment can be used by network entities of the system 100, or outside entities that are communicatively coupled to the system 100, to make decisions of whether to re-direct or re-route data for the UE 102 by predicting where the UE 102 will be located in the future. SDN packet processing capabilities can be leveraged by the network or outside entities such that an optimal endpoint is chosen to receive the data for the UE 102. The data re-direction can take place, at a certain network node, prior to standard packet routing, as standard routing for a data packet includes transmitting the packet to a location where the UE 102 originally requested the data, and has since moved. SDN data re-directing operations are suitable for implementation in an NFV system (e.g., SDN architecture using virtualized network functions) where packet forwarding rules can be applied to overcome limitations in client IP routing layers.

A first state of an SDN data re-direction operation may be a detection state 202. For example, a network entity such as a RAN node (e.g., EP 104A) may detect that a signal strength of the UE 102 is attenuating and may assume that the UE 102 is moving farther from EP 104A and closer to a second EP (e.g., EP 104B). In some aspects, the UE 102 may be travelling such that EP 104A is preparing to handover the UE 102 to EP 104B, or EP 104A has transmitted handover signaling to handoff the connection with UE 102. In handing over the UE 102 connection, the EP 104A may also inform another entity, directly or indirectly (e.g., through MME signal snoops), of the node that the UE connection is being handed over to or the UE's new location (e.g., EP 104B).

In some aspects, an entity such as an LQP server can use metrics gathered from existing radio channel quality indicators, or other parameters known by a network service provider, to detect a moving UE and predict a handover. Such parameters can include local or regional network infrastructure state and layout, time, location, environment, and physical movement behavior. The LQP server can apply data processing such as data mining, artificial intelligence (AI)/machine learning (ML) to predict near or mid-future link quality (e.g., of a wireless channel, of the core network, etc.). The LQP server can distribute link quality predictions or handover prediction information 114 in a frame format to the router 106A. The LQP server can transmit the handover prediction information 114 with single or multiple time-based predictions that may have vastly different types (e.g., bandwidth, latency, transmission power, bit-error-rate, etc.). In some aspects, distribution is carried out through an easily accessible network service where each link is identified with a unique key, allowing for invited external consumers to receive the link quality predictions.

In another state of an SDN data re-direction operation, the router (e.g., or switch) receiving a link quality prediction (e.g., handover prediction information 114) or a handover indication (e.g., from a EP, UE, or other network entity) can use such information to update an SDN relocation table in state 204. In some aspects, the SDN relocation table is a short-lived table that is stored in memory of an apparatus of the router and behaves similar to a cache. The short-lived SDN relocation table can store information for a short period of time or the table itself may only exist for a short period of time. For example, a typical time period between a data packet request and data packet reply can be far less that one second (e.g., milliseconds). In certain aspects, the short-lived SDN relocation table can store information or exist for greater than one second, for example, a minute or greater. Such cases could include a request for a large amount of data, for example, a video file. In some aspects, the network can wait until a base routing table (e.g., forwarding or routing table configured by the control plane) is updated.

Figure 3:
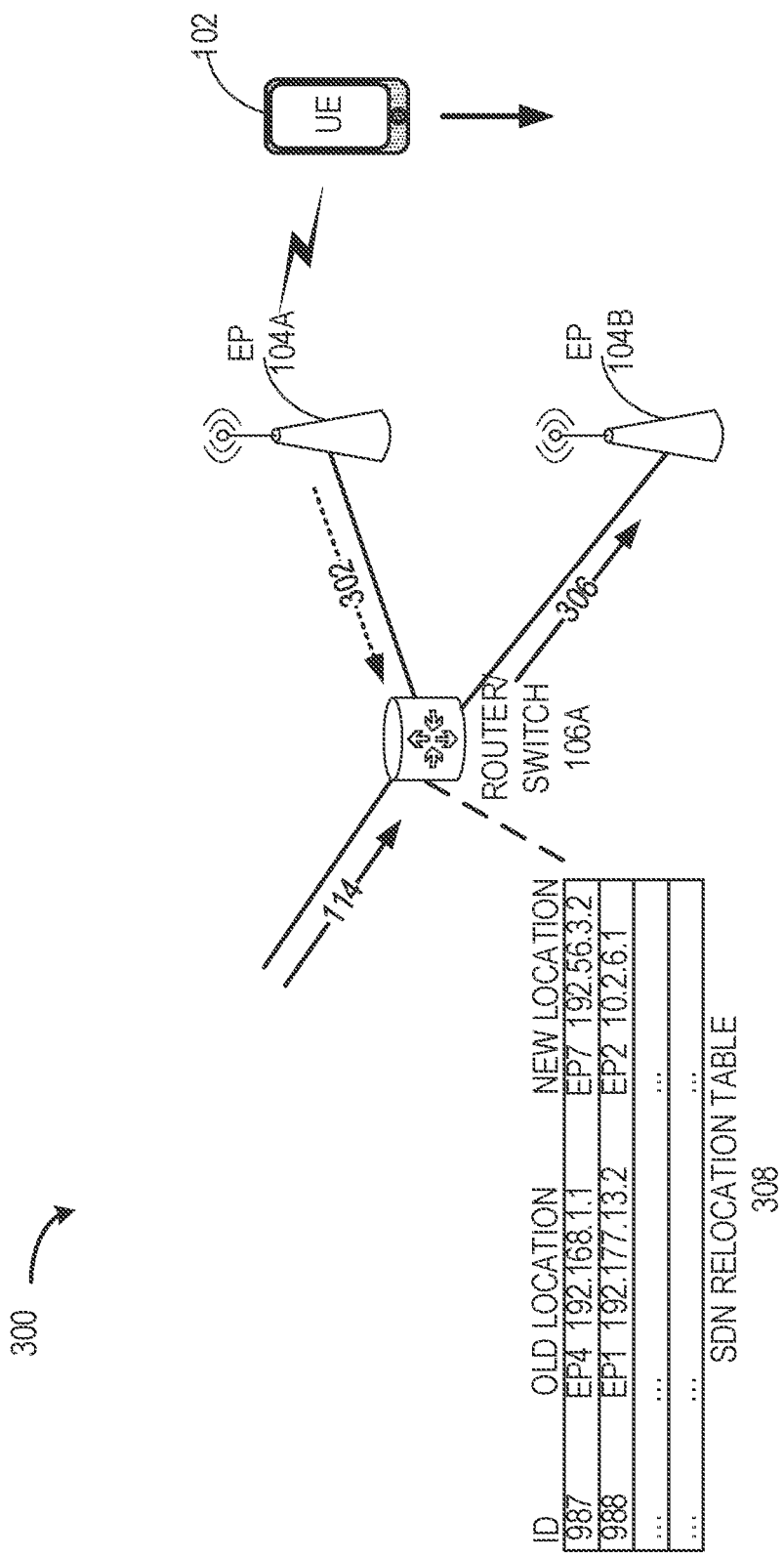
FIG. 3 illustrates an exemplary architecture of a system of a network, in accordance with some aspects.

As shown in FIG. 3, the SDN relocation table can store entries associated with a client (e.g., UE 102) that has moved, or is about to move, to another coverage area or geographic location of a EP, and for which any data packets requested from that UE should be forwarded. Further, the SDN relocation table can include the information to fulfill such forwarding, as described with respect to FIG. 3. In state 206, the UE 102 may be handed over to a new EP and the router or switch, having knowledge of the new location, can re-direct any data packets for the UE 102 to the new location, avoiding re-requesting of data packets, resource intensive forwarding, and time delays.

FIG. 3 illustrates an architecture of a system 300 of a network, in accordance with some aspects. In some aspects, the system 300 may be the similar or the same as system 100 and configured for SDN operations, such as data re-direction, and may include virtualized network entities and/or functions. The system 300 may be similar to, or part of, the systems 400A and 400B of FIGS. 4A and 4B. System 300 can include wired or wireless connections (e.g., communicative coupling) to wired or wireless communication devices, such as client devices, UE, vehicular devices, aerial devices, and/or client devices within such vehicular and aerial devices.

In general, when the UE 102 requests data packets while within a coverage area of a first EP (e.g., EP 104A), the packet flow of FIG. 3 would be directed from a data packet source, such as the data center 110, towards EP 104A. However at the point in time of the packet flow, the UE 102 may have been handed over to another EP (e.g., EP 104B). In this case, a network routing apparatuses, such as the router (e.g., or switch) 106A physically shifts the packet flow down toward the new destination of the UE 102. In some aspects, the router 106A or another entity can refer to a higher point in the IP stack and determine not only a next hop but also a destination for the packet. Similarly another router or switch (e.g., router 106C), for example, at a lower aggregation point can direct the UE traffic to the next EP (e.g., EP 104C).

In some aspects, an apparatus of the router (e.g., switch) 106A (e.g., including processing circuitry and memory) can be configured to decode an indication of a handover (e.g., 302 received from the EP 104A) of the UE 102 from EP 104A (e.g., BS) to EP 104B, and the indication can be received in signaling from a network entity (e.g., EP 104A, EP 104B, MME/AMF, or other network entity). The indication can include various information to identify the UE 102 and indicate a direction of travel or handover, such as a UE identifier of the UE 102. In some aspects, the indication can also include one of more other identifiers of the EP that is handing off and the EP that is receiving the handover connection of the UE 102 (e.g., IP addresses).

The router 106A (e.g., or switch) may also receive, handover prediction information 114 from a network entity or outside entity that is configured to trigger a data packet re-direction. In some aspects, handover prediction information may also be part of the handover indication or may include the handover indication itself. The router 106A may also receive such information at different times or simultaneously. In some aspects, the handover prediction information 114 can include an indication of a predicted future geographic location of the UE 102, and may include one or more indications of a bandwidth parameter, a latency parameter, a transmission power parameter, or a bit-error-rate parameter, associated with the UE.

After receiving the handover indication (e.g., or the handover prediction information), the router 106A (e.g., or switch) can update an SDN relocation table 308 (e.g., stored in the memory of the router or in the SDN domain) based on the handover indication or handover prediction information. The SDN relocation table 308, as shown in FIG. 3, may be configured to store, include, or indicate the UE identifier, an identifier of an old location (e.g., of the first EP/BS), and an identifier of a new location (e.g., of the second EP/BS). In some aspects, the identifiers may be network IP addresses, although aspects are not so limited.

Accordingly, after the SDN relocation table is updated, the router is able to re-direct any data packets 306 that are configured (e.g., addressed) for transmission to the UE 102 to the updated and accurate location of the UE 102, for example, re-direct the data packets 306 to the EP 104B. To re-direct the data packets 306, in some aspects, the router 106A can modify the data packets. This may include, for example, modifying information in a packet header, such as a destination address.

In some aspects, the router 106A may be configured to discard information (e.g., UE identifier, EP/BS identifier) from the SDN relocation table 308 after a threshold period. The discarding of information could include erasing the information or overwriting the information in memory or in the SDN domain. The threshold period can include, as non-limiting examples, an expiration time that can be specified in handover indications or handover prediction information, a period after re-routing/re-directing a modified packet to a new location, after another update to the SDN relocation table is performed, when another packet request is received from the UE or another UE, when a handover indication is received, or when handover prediction information is received. In certain aspects, the router or switch can store in memory (e.g., device memory or SDN domain) a forwarding table that is configured by a network controller (e.g., SDN controller), and the forwarding table may include or be configured according to network routing policies. By updating the SDN relocation table and re-directing a data packet, the router 106A may be overriding the routing policies configured by the SDN controller.

The router may be configured to re-direct data packets and duplicate the transmissions of the data packets. For example, in some cases of a high-priority data requests. If it cannot be determined, for example, through a handover indication or handover prediction information where the UE 102 is moving and where a destination coverage area will be, the router 106A or switch can re-direct a modified data packet to a new location (e.g., EP 104B) and can also forward the data packet to the previous location (e.g., EP 104A) or another location. If the UE 102 has already moved on by the time the data packet reaches the previous location, the data packet could be discarded after assuring that the re-directed (e.g., modified) packet transmitted to the new location has been received successfully by the UE 102. In some aspects, a source of the data packet may be a data center 110. However, the data packet re-direction operations described herein may also apply to a data source being a local or regional content delivery network (CDN), or a data source that is part of an edge services network (e.g., edge server).

Figure 4A:
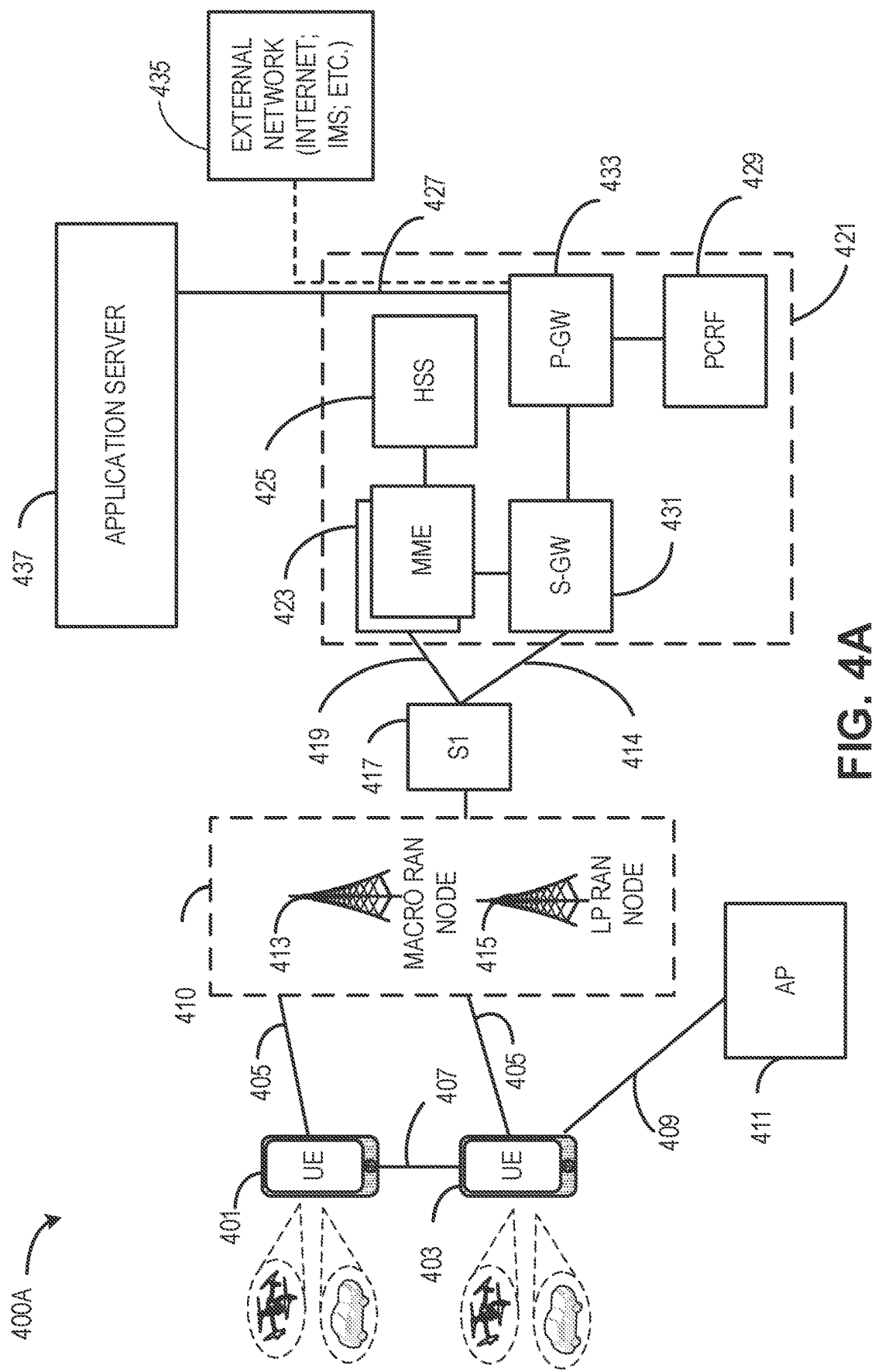
FIG. 4A illustrates an exemplary architecture of a network in accordance with some aspects.

FIG. 4A illustrates an architecture of a system 400A of a network in accordance with some aspects. In some aspects, the system 400A may be configured for the data re-direction operations described above. The system 400A is shown to include a user equipment (UE) 401 and a UE 401/403, for example a UE configured for operating in an SDN. The UEs 401/403 may be smartphones (e.g., handheld touchscreen mobile computing devices connectable to one or more cellular networks) or any mobile or non-mobile computing device, such as Personal Data Assistants (PDAs), pagers, laptop computers, desktop computers, wireless handsets, or any computing device including a wireless communications interface. In some aspects, the UE 401/403 may be Internet-of-Things (IoT)-enabled devices, configured to communicate with a RAN 410 or a core network (CN) 421, including but not limited to vehicles or drones.

In some aspects, any of the UEs 401/403 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401/403 may be configured to connect, in a wired or wireless configuration, e.g., communicatively couple, with a radio access network (RAN) 410. The RAN 410 may be, for example, an Evolved Universal Mobile Telecommunications System (UMTS) Terrestrial Radio Access Network (E-UTRAN), a NextGen RAN (NG-RAN), 5G RAN, or some other type of RAN. The UEs 401/403 utilize connections 405, each of which comprises a physical communications interface or layer (discussed in further detail below); in this example, the connections 405 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this aspect, the UEs 401/403 may further directly exchange communication data via a ProSe interface 407. The ProSe interface 407 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). The UE 401/403 is shown to be configured to access an access point (AP) 411 via connection 409. The connection 409 can comprise a local wireless connection, such as a connection consistent with any IEEE 802.11 protocol, where the AP 411 would comprise a wireless fidelity (WiFi®) router. In this example, the AP 411 is shown to be connected to the Internet without connecting to the core network of the wireless system (described in further detail below).

The RAN 410 can include one or more access nodes (ANs) or access points (APs) that enable the connections 405, for example, for SDN data re-direction operations. These ANs can be referred to as base stations (BSs), NodeBs, evolved NodeBs (eNBs), next Generation NodeBs (e.g., gNB, ng-eNB), RAN nodes, and so forth, and can comprise ground stations (e.g., terrestrial access points) or satellite stations providing coverage within a geographic area (e.g., a cell). In some aspects, the communication nodes 413 and 415 can be transmission/reception points (TRPs). In instances when the communication nodes 413 and 415 are NodeBs (e.g., eNBs or gNBs), one or more TRPs can function within the communication cell of the NodeBs. In some aspects, a NodeB can be a E-UTRA-NR (EN)-gNB (en-gNB) configured to support E-UTRA-NR Dual Connectivity (EN-DC) (e.g., multi-RAT Dual Connectivity (MR-DC)), in which a UE may be connected to one eNB that acts as a master node (MN) and one en-gNB that acts as a secondary node (SN).

The RAN 410 may include one or more RAN nodes for providing macrocells, e.g., macro RAN node 413, and one or more RAN nodes for providing femtocells or picocells (e.g., cells having smaller coverage areas, smaller user capacity, or higher bandwidth compared to macrocells), e.g., low power (LP) RAN node 415. Any of the RAN nodes 413 and 415 can terminate the air interface protocol and can be the first point of contact for the UEs 401/403. In some aspects, any of the RAN nodes 413 and 415 can fulfill various logical functions for the RAN 410 including, but not limited to, radio network controller (RNC) functions such as radio bearer management, uplink and downlink dynamic radio resource management and data packet scheduling, and mobility management. In an example, any of the nodes 413 or 415 can be a new generation node-B (gNB), an evolved node-B (eNB), or another type of RAN node.

In accordance with some aspects, the UEs 401/403 can be configured to communicate using Orthogonal Frequency-Division Multiplexing (OFDM) communication signals with each other or with any of the RAN nodes 413 and 415 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 413 and 415 to the UEs 401/403, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements, in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401/403. The physical downlink control channel (PDCCH) may carry information about the transport format and resource allocations related to the PDSCH channel, among other things. It may also inform the UEs 401/403 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 413 and 415 based on channel quality information fed back from any of the UEs 401/403. The downlink resource assignment information may be sent on the PDCCH used for (e.g., assigned to) each of the UEs 401/403.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

Entities within a RAN (e.g., RAN 410), such as RAN Nodes (e.g., 413, 415), can be connected (e.g., communicatively coupled), in a wired or wireless configuration, to one or more network entities, including to one another. For example, a connection can include a backhaul connection. Wired connections can include ethernet, coaxial cable, fiber optic cable, although aspects are not so limited. The RAN 410 is shown to be communicatively coupled to a core network (CN) 421 via an S1 interface 417. In aspects, the CN 421 may be an evolved packet core (EPC) network, a NextGen Packet Core (NPC) network, or some other type of CN (e.g., as illustrated in reference to FIGS. 4B-4I). In this aspect the S1 interface 417 is split into two parts: the S1-U interface 414, which carries traffic data between the RAN nodes 413 and 415 and the serving gateway (S-GW) 431, and the S1-mobility management entity (MME) interface 419, which is a signaling interface between the RAN nodes 413 and 415 and MMEs 423.

In this aspect, the CN 421 comprises the MMEs 423, the S-GW 431, the Packet Data Network (PDN) Gateway (P-GW) 423, and a home subscriber server (HSS) 425. The MMEs 423 may be similar in function to the control plane of legacy Serving General Packet Radio Service (GPRS) Support Nodes (SGSN). The MMEs 423 may manage mobility aspects in access such as gateway selection and tracking area list management. The HSS 425 may comprise a database for network users, including subscription-related information to support the network entities' handling of communication sessions. The CN 421 may comprise one or several HSSs 425, depending on the number of mobile subscribers, on the capacity of the equipment, on the organization of the network, etc. For example, the HSS 425 can provide support for routing/roaming, authentication, authorization, naming/addressing resolution, location dependencies, etc.

The S-GW 431 may terminate the S1 interface 419 towards the RAN 410, and route data packets between the RAN 410 and the CN 421. In addition, the S-GW 431 may be a local mobility anchor point for inter-RAN node handovers and also may provide an anchor for inter-3GPP mobility. Other responsibilities may include lawful intercept, charging, and some policy enforcement. The P-GW 433 may terminate an SGi interface toward a PDN. The P-GW 433 may route data packets between the CN 421 and external networks such as a network including the application server 437 (alternatively referred to as application function (AF)) via an Internet Protocol (IP) interface 427. The P-GW 433 can also communicate data to other external networks 435, which can include the Internet, IP multimedia subsystem (IPS) network, and other networks. Generally, the application server 437 may be an element offering applications that use IP bearer resources with the core network (e.g., UMTS Packet Services (PS) domain, LTE PS data services, etc.). In this aspect, the P-GW 433 is shown to be communicatively coupled to an application server 437 via an IP communications interface 427. The application server 437 can also be configured to support one or more communication services (e.g., Voice-over-Internet Protocol (VoIP) sessions, PTT sessions, group communication sessions, social networking services, etc.) for the UEs 401/403 via the CN 421.

The P-GW 433 may further be a node for policy enforcement and charging data collection. Policy and Charging Enforcement Function (PCRF) 429 is the policy and charging control element of the CN 421. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 429 may be communicatively coupled to the application server 437 via the P-GW 433. The application server 437 may signal the PCRF 429 to indicate a new service flow and select the appropriate Quality of Service (QoS) and charging parameters. The PCRF 429 may provision this rule into a Policy and Charging Enforcement Function (PCEF) (not shown) with the appropriate traffic flow template (TFT) and QoS class of identifier (QCI), which commences the QoS and charging as specified by the application server 437.

In an example, any of the nodes 413 or 415 can be configured to communicate to the UEs 401/403 (e.g., dynamically) by an antenna panel selection and a receive (Rx) beam selection that can be used by the UE for data reception on a physical downlink shared channel (PDSCH) as well as for channel state information reference signal (CSI-RS) measurements and channel state information (CSI) calculation. In an example, any of the nodes 413 or 415 can be configured to communicate to the UEs 401/403 (e.g., dynamically) by an antenna panel selection and a transmit (Tx) beam selection that can be used by the UE for data transmission on a physical uplink shared channel (PUSCH) as well as for sounding reference signal (SRS) transmission.

In some aspects, the communication network 440A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected or reduced. In addition, some NB-IoT UEs can be configured to transmit at maximum power if repetitions are used for UL transmission. This may result in large inter-cell interference in dense small cell deployments.

Figure 4B:
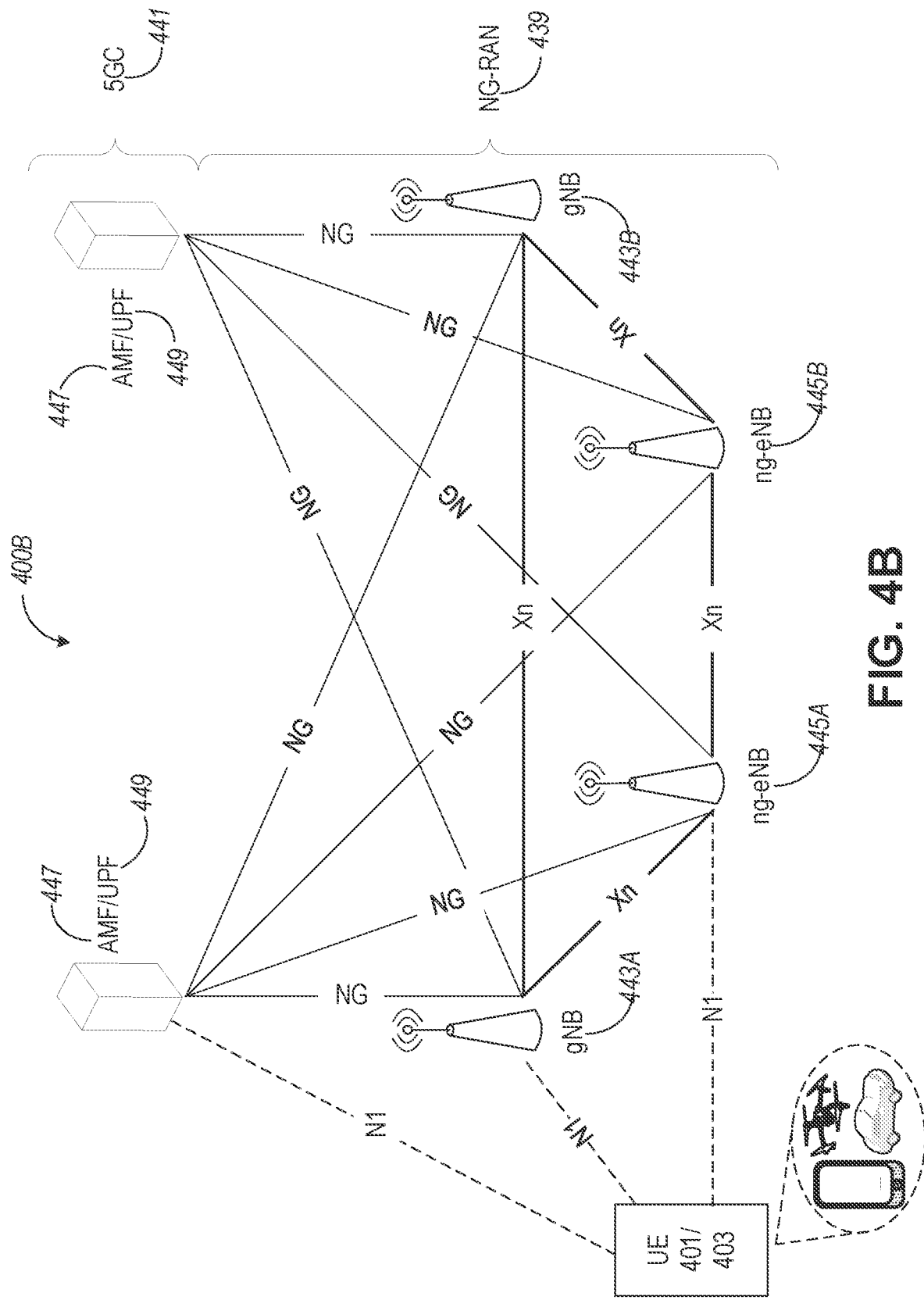
FIG. 4B is a simplified diagram of an exemplary Next-Generation (NG) system architecture in accordance with some aspects.

FIG. 4B illustrates an exemplary Next Generation (NG) system architecture 400B in accordance with some aspects. Referring to FIG. 4B, the NG system architecture 400B includes NG-RAN 439 and a 5G network core (5GC) 441. The NG-RAN 439 can include a plurality of nodes, for example, gNBs 443A and 443B, and NG-eNBs 445A and 445B. System 400B can include wired or wireless connections (e.g., communicative coupling) to wired or wireless communication devices, such as client devices. The gNBs 443A/443B and the NG-eNBs 445A/445B can be communicatively coupled to the UE 401/403 via, for example, an N1 interface. The core network 441 (e.g., a 5G core network or 5GC) can include an access and mobility management function (AMF) 447 or a user plane function (UPF) 449. The AMF 447 and the UPF 449 can be communicatively coupled to the gNBs 443A/443B and the NG-eNBs 445A/445B via NG interfaces. More specifically, in some aspects, the gNBs 443A/443B and the NG-eNBs 445A/445B can be connected to the AMF 447 by NG-C interfaces, and to the UPF 449 by NG-U interfaces. The gNBs 443A/443B and the NG-eNBs 445A/445B can be coupled to each other via Xn interfaces.

In some aspects, a gNB 443 can include a node providing New Radio (NR) user plane and control plane protocol termination towards the UE, and can be connected via the NG interface to the 5GC 441. In some aspects, an NG-eNB 445A/445B can include a node providing evolved universal terrestrial radio access (E-UTRA) user plane and control plane protocol terminations towards the UE, and is connected via the NG interface to the 5GC 441. In some aspects, any of the gNBs 443A/443B and the NG-eNBs 445A/445B can be implemented as a base station (BS), a mobile edge server, a small cell, a home eNB, although aspects are not so limited.

Figure 4C:
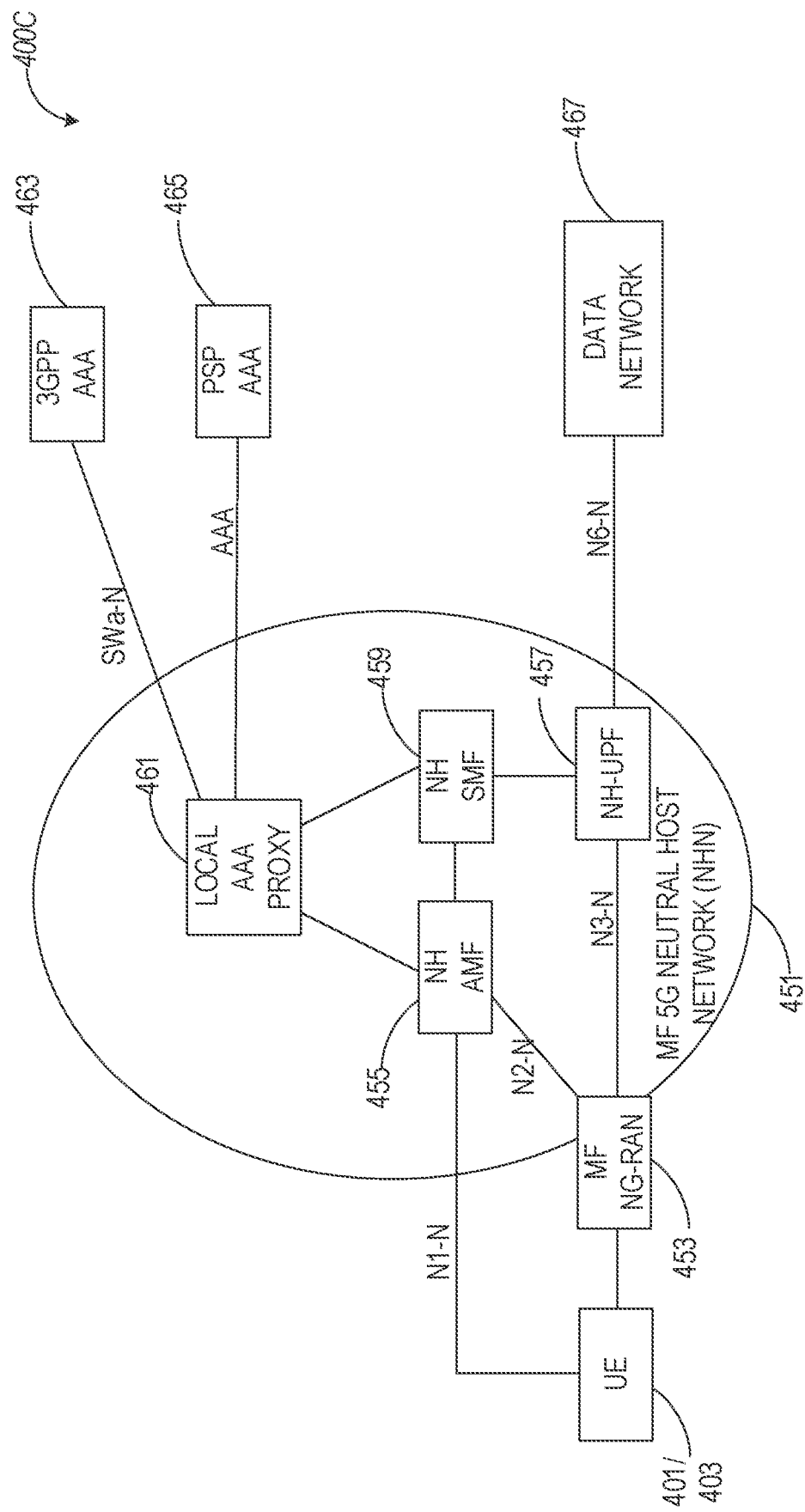
FIG. 4C illustrates an example MulteFire Neutral Host Network (NHN) 5G architecture in accordance with some aspects.

FIG. 4C illustrates an example MulteFire Neutral Host Network (NHN) 5G architecture 400C in accordance with some aspects. Referring to FIG. 4C, in some aspects, the MulteFire 5G architecture 400C can include a wireless communication device, such as a UE (e.g., UE 401/403), a NG-RAN (e.g., NG-RAN 439 or similar) and a core network (e.g., core network 441 or similar). The NG-RAN can be a MulteFire NG-RAN (MF NG-RAN) 453, and the core network can be a MulteFire 5G neutral host network (NHN) 451. In some aspects, the MF NHN 451 can include a neutral host AMF (NH AMF) 455, a NH SMF 459, a NH UPF 457, and a local Authentication, Authorization and Accounting (AAA) proxy 461. The AAA proxy 461 can provide connection to a 3GPP AAA server 463 and a participating service provider AAA (PSP AAA) server 465. The NH-UPF 457 can provide a connection to a data network 467.

The MF NG-RAN 453 can provide similar functionalities as an NG-RAN operating under a 3GPP specification. The NH-AMF 455 can be configured to provide similar functionality as an AMF in a 3GPP 5G core network (e.g., described further in reference to FIG. 4D). The NH-SMF 459 can be configured to provide similar functionality as a SMF in a 3GPP 5G core network (e.g., described further in reference to FIG. 4D). The NH-UPF 457 can be configured to provide similar functionality as a UPF in a 3GPP 5G core network (e.g., described further in reference to FIG. 4D).

Figure 4D:
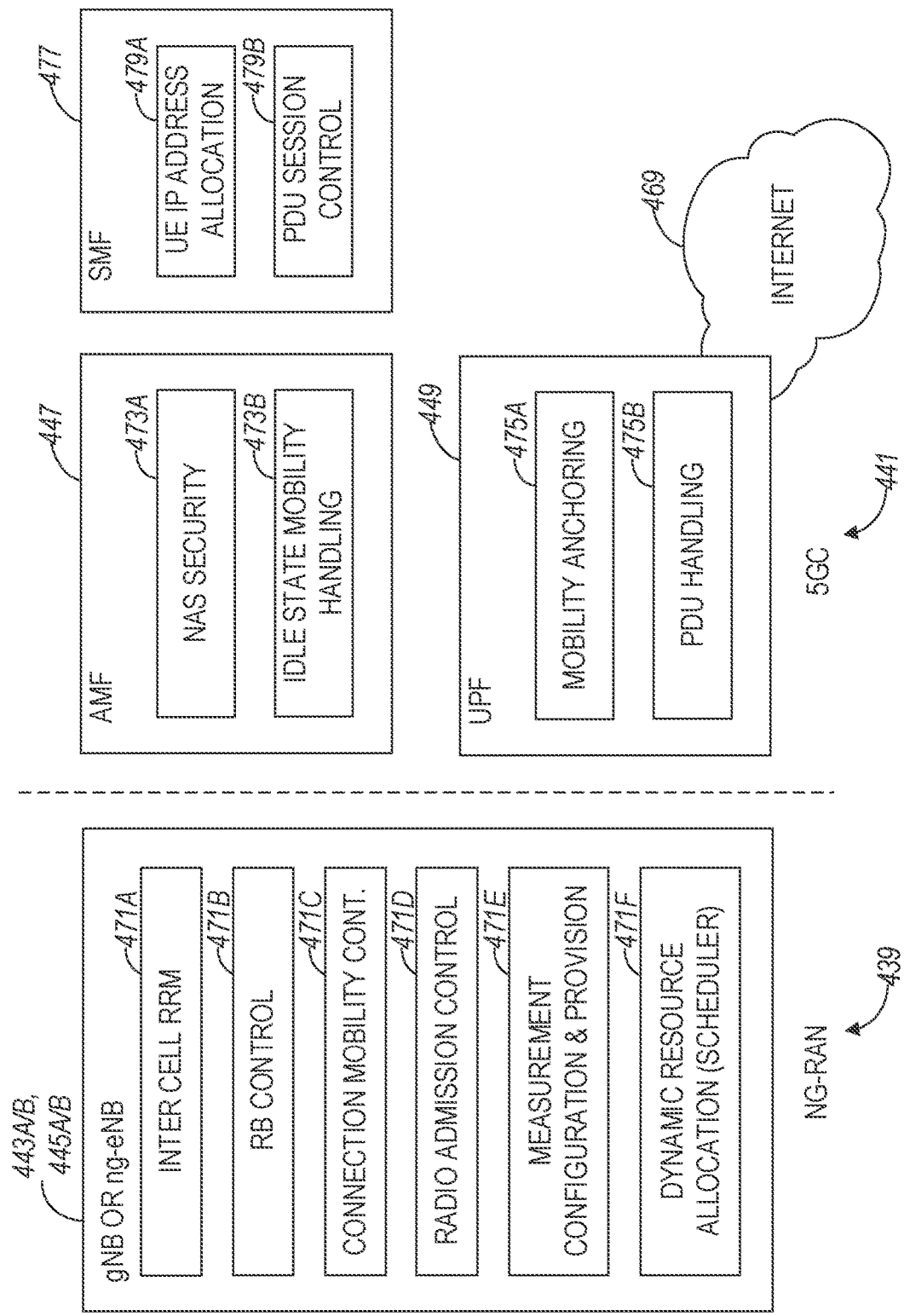
FIG. 4D illustrates an exemplary functional split between next generation radio access network (NG-RAN) and the 5G Core network (5GC) in accordance with some aspects.

FIG. 4D illustrates a functional split between a NG-RAN (e.g., NG-RAN 439) and a 5G Core (e.g., 5GC 441) in accordance with some aspects. FIG. 4D illustrates some of the functionalities the gNBs 443A/443B and the NG-eNBs 445A/445B can perform within the NG-RAN 439, as well as the AMF 447, the UPF 449, and a Session Management Function (SMF) 477 within the 5GC 441. In some aspects, the 5GC 441 can provide access to the Internet 469 to one or more devices via the NG-RAN 439.

In some aspects, the gNBs 443A/443B and the NG-eNBs 445A/445B can be configured to host the following functions: functions for Radio Resource Management (e.g., inter-cell radio resource management 471A, radio bearer control 471B, connection mobility control 471C, radio admission control 471D, dynamic allocation of resources to UEs in both uplink and downlink (scheduling) 471F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 471E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 447 can be configured to host the following functions, for example: NAS signaling termination; NAS signaling security 479A; access stratum (AS) security control; inter core network (CN) node signaling for mobility between 3GPP access networks; idle state/mode mobility handling 479B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; or SMF selection, among other functions.

The UPF 449 can be configured to host the following functions, for example: mobility anchoring 475A (e.g., anchor point for Intra-/Inter-RAT mobility); packet data unit (PDU) handling 475B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions. The Session Management function (SMF) 477 can be configured to host the following functions, for example: session management; UE IP address allocation and management 479A; selection and control of user plane function (UPF); PDU session control 479B, including configuring traffic steering at UPF 449 to route traffic to proper destination; control part of policy enforcement and QoS; or downlink data notification, among other functions.

Figure 4E:
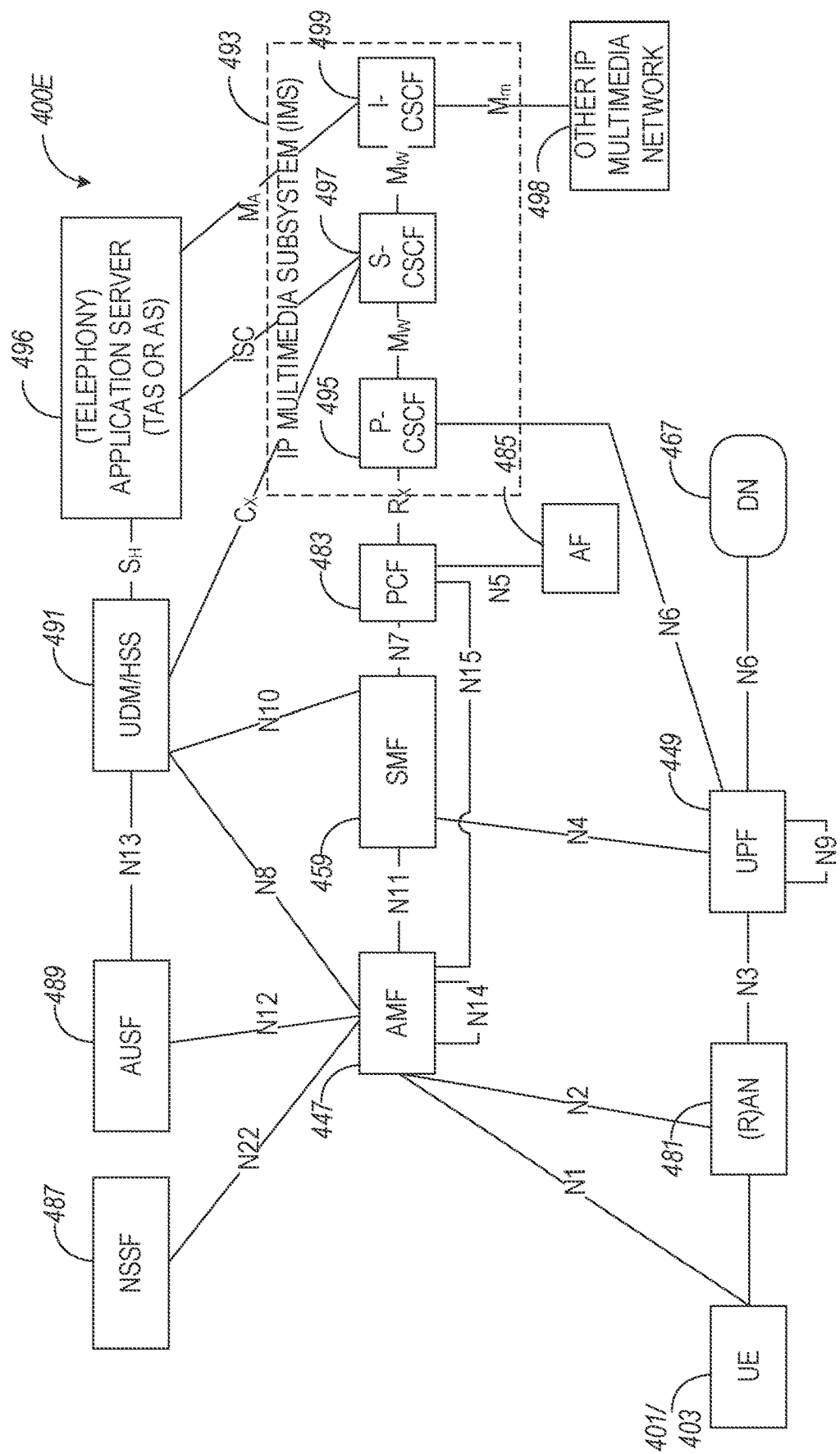
FIG. 4E illustrates an exemplary non-roaming 5G system architecture in accordance with some aspects.
Figure 4F:
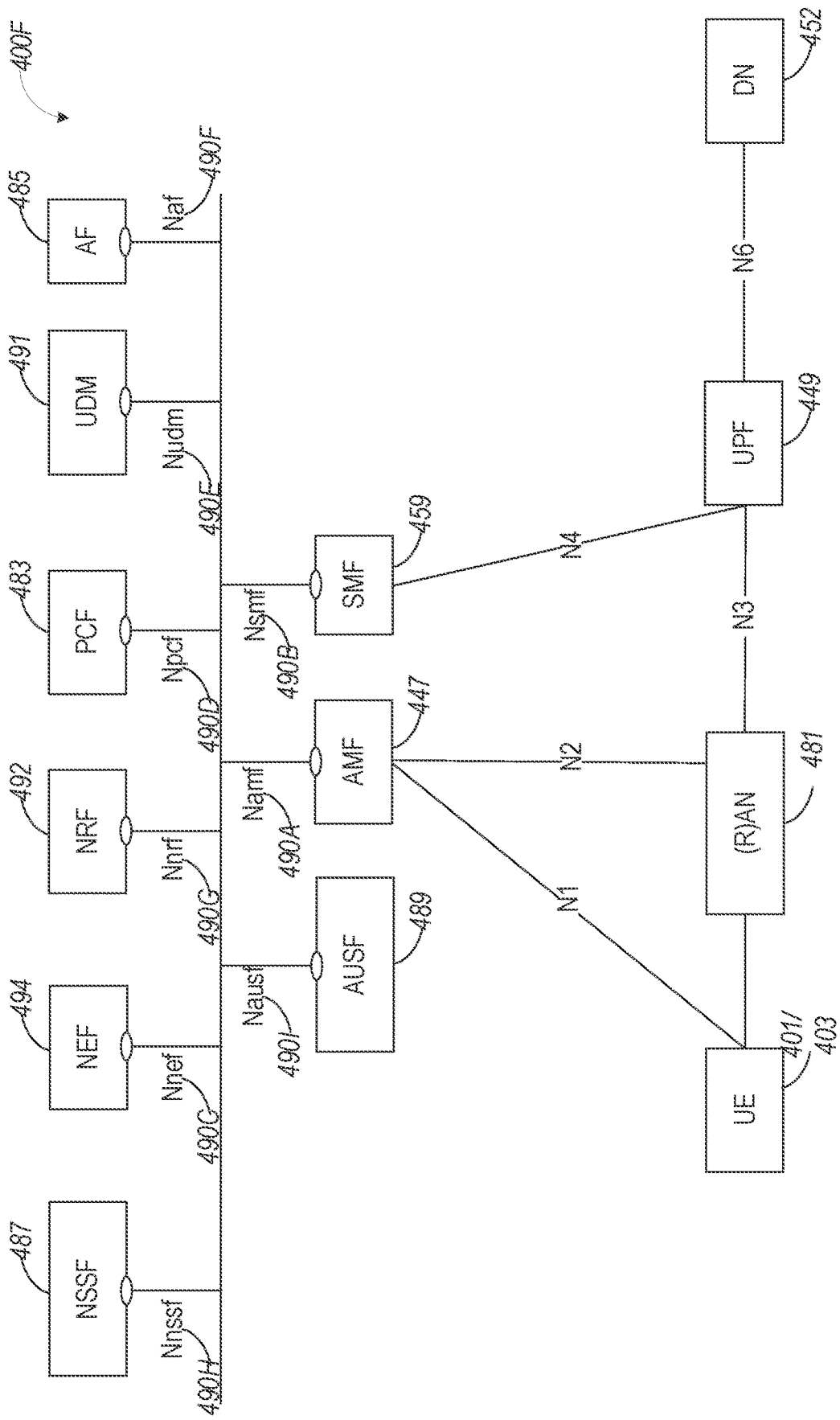
FIG. 4F illustrates an exemplary non-roaming 5G system architecture in accordance with some aspects.

FIG. 4E and FIG. 4F illustrate a non-roaming 5G system architecture in accordance with some aspects. Referring to FIG. 4E, an exemplary 5G system architecture 400E in a reference point representation is illustrated. More specifically, UE 401/403 can be in communication with RAN 481 as well as one or more other 5G core (5GC) network entities. The 5G system architecture 400E includes a plurality of network functions (NFs), such as access and mobility management function (AMF) (e.g., 447), session management function (SMF) (e.g., 459), policy control function (PCF) 483, application function (AF) 485, user plane function (UPF) (e.g., 449), network slice selection function (NSSF) 487, authentication server function (AUSF) 489, and unified data management (UDM)/home subscriber server (HSS) 491. The UPF 449 can provide a connection to a data network (DN) (e.g., 467), which can include, for example, operator services, Internet access, or third-party services. The AMF 447 can be used to manage access control and mobility and can also include network slice selection functionality. The SMF 459 can be configured to set up and manage various sessions according to a network policy. The UPF 449 can be deployed in one or more configurations according to a desired service type. The PCF 483 can be configured to provide a policy framework using network slicing, mobility management, and roaming (similar to PCRF in a 4G communication system). The UDM 491 can be configured to store subscriber profiles and data (similar to an HSS in a 4G communication system).

In some aspects, the 5G system architecture 400E includes an IP multimedia subsystem (IMS) 493 as well as a plurality of IP multimedia core network subsystem entities, such as call session control functions (CSCFs). More specifically, the IMS 493 includes a CSCF, which can act as a proxy CSCF (P-CSCF) 495 a serving CSCF (S-CSCF) 497, an emergency CSCF (E-CSCF) (not illustrated in FIG. 4E), or interrogating CSCF (I-CSCF) 499. The P-CSCF 495 can be configured to be the first contact point for the UE 401/403 within the IM subsystem (IMS) 493. The S-CSCF 497 can be configured to handle the session states in the network, and the E-CSCF can be configured to handle certain aspects of emergency sessions such as routing an emergency request to the correct emergency center or public safety answering point (PSAP). The I-CSCF 499 can be configured to function as the contact point within an operator's network for all IMS connections destined to a subscriber of that network operator, or a roaming subscriber currently located within that network operator's service area. In some aspects, the I-CSCF 499 can be connected to another IP multimedia network 498, (e.g. an IMS operated by a different network operator).

In some aspects, the UDM/HSS 491 can be coupled to an application server 496, which can include a telephony application server (TAS) or another application server (AS). The AS 496 can be coupled to the IMS 493 via the S-CSCF 497 or the I-CSCF 499. In some aspects, the 5G system architecture 400E can use a unified access barring mechanism using one or more of the techniques described herein, which access barring mechanism can be applicable for all RRC states of the UE 401/403, such as RRC_IDLE, RRC_CONNECTED, and RRC_INACTIVE states.

In some aspects, the 5G system architecture 400E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

FIG. 4F illustrates an exemplary 5G system architecture 400F and a service-based representation. System architecture 400F can be substantially similar to (or the same as) system architecture 400E. In addition to the network entities illustrated in FIG. 4E, system architecture 400F can also include a network exposure function (NEF) 494 and a network repository function (NRF) 492. In some aspects, 5G system architectures can be service-based and interaction between network functions can be represented by corresponding point-to-point reference points Ni (as illustrated in FIG. 4E) or as service-based interfaces (as illustrated in FIG. 4F).

A reference point representation shows that an interaction can exist between corresponding NF services. For example, FIG. 4E illustrates the following reference points: N1 (between the UE 401/403 and the AMF 447), N2 (between the RAN 481 and the AMF 447), N3 (between the RAN 481 and the UPF 449), N4 (between the SMF 459 and the UPF 449), N5 (between the PCF 483 and the AF 485), N6 (between the UPF 449 and the DN 452), N7 (between the SMF 459 and the PCF 483), N8 (between the UDM 491 and the AMF 447), N9 (between two UPFs 449, additional UPF not shown), N10 (between the UDM 491 and the SMF 459), N11 (between the AMF 447 and the SMF 459), N12 (between the AUSF 489 and the AMF 447), N13 (between the AUSF 489 and the UDM 491), N14 (between two AMFs 447, additional AMF not shown), N15 (between the PCF 483 and the AMF 447 in case of a non-roaming scenario, or between the PCF 483 and a visited network and AMF 447 in case of a roaming scenario, not shown), N16 (between two SMFs; not illustrated in FIG. 4E), and N22 (between AMF 447 and NSSF 487, not shown). Other reference point representations not shown in FIG. 4E can also be used.

In some aspects, as illustrated in FIG. 4F, service-based representations can be used to represent network functions within the control plane that enable other authorized network functions to access their services. In this regard, 5G system architecture 400F can include the following service-based interfaces: Namf 490A (a service-based interface exhibited by the AMF 447), Nsmf 490B (a service-based interface exhibited by the SMF 459), Nnef 490C (a service-based interface exhibited by the NEF 494), Npcf 490D (a service-based interface exhibited by the PCF 483), a Nudm 490E (a service-based interface exhibited by the UDM 491), Naf 490F (a service-based interface exhibited by the AF 485), Nnrf 490G (a service-based interface exhibited by the NRF 492), Nnssf 490H (a service-based interface exhibited by the NSSF 487), Nausf 4901 (a service-based interface exhibited by the AUSF 489). Other service-based interfaces (e.g., Nudr, N5g-eir, and Nudsf) not shown in FIG. 4F can also be used.

Figure 4G:
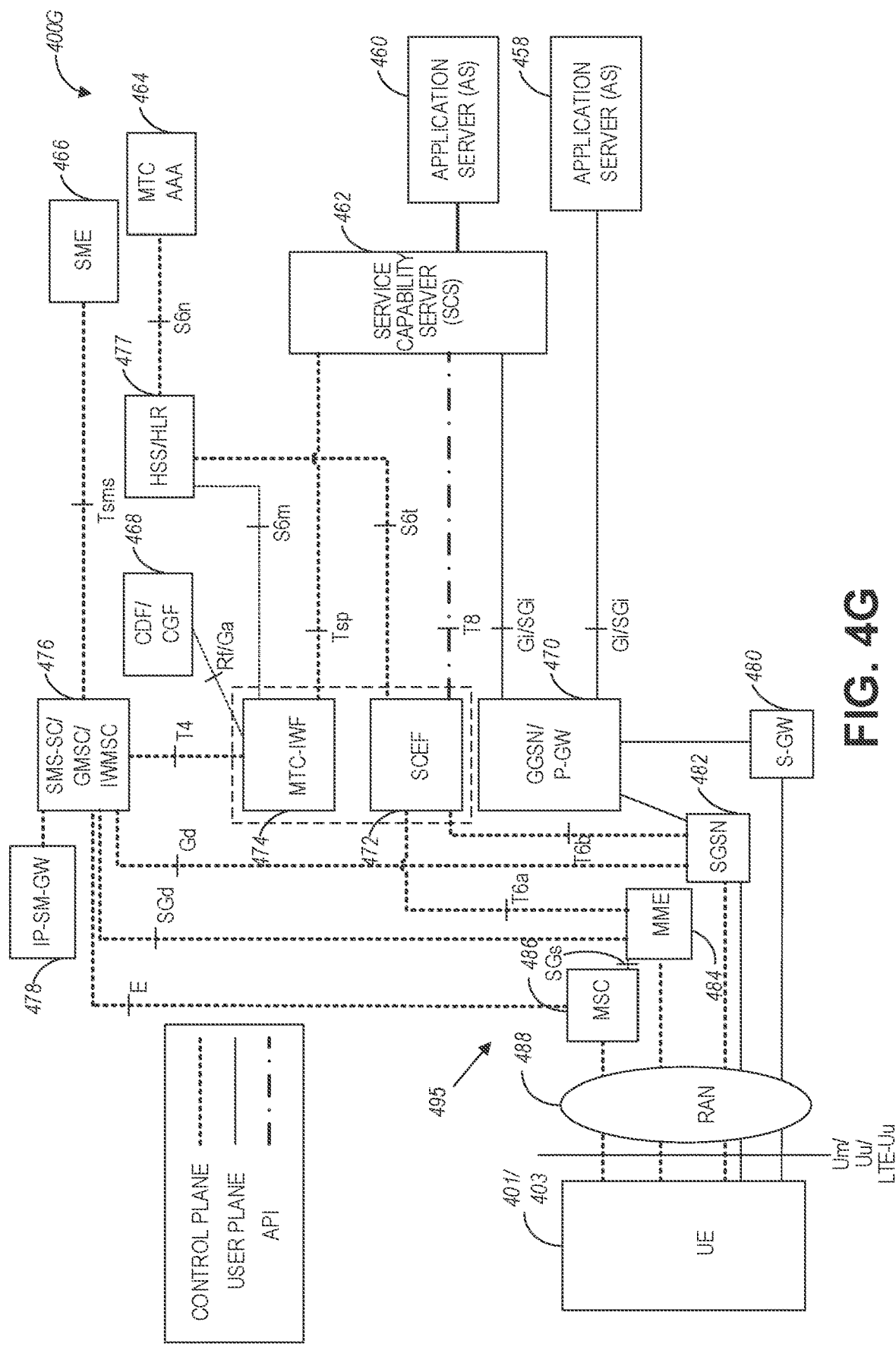
FIG. 4G illustrates an example Cellular Internet-of-Things (CIoT) network architecture in accordance with some aspects.

FIG. 4G illustrates an exemplary consumer IoT (CIoT) network architecture in accordance with some aspects. Referring to FIG. 4G, the CIoT architecture 400G can include the UE 401/403 and the RAN 488 coupled to a plurality of core network entities. In some aspects, the UE 401/403 can be a machine-type communication (MTC) UE. The CIoT network architecture 400G can further include a mobile services switching center (MSC) 486, MME 484, a serving GPRS support note (SGSN) 482, a S-GW 480, an IP-Short-Message-Gateway (IP-SM-GW) 478, a Short Message Service-Service Center (SMS-SC)/gateway mobile service center (GMSC)/Interworking MSC (IWMSC) 476, MTC interworking function (MTC-IWF) 474, a Service Capability Exposure Function (SCEF) 472, a gateway GPRS support node (GGSN)/Packet-GW (P-GW) 470, a charging data function (CDF)/charging gateway function (CGF) 468, a home subscriber server (HSS)/a home location register (HLR) 477, short message entities (SME) 466, MTC authorization, authentication, and accounting (MTC AAA) server 464, a service capability server (SCS) 462, and application servers (AS) 460 and 458. In some aspects, the SCEF 472 can be configured to securely expose services and capabilities provided by various 3GPP network interfaces. The SCEF 472 can also provide means for the discovery of the exposed services and capabilities, as well as access to network capabilities through various network application programming interfaces (e.g., API interfaces to the SCS 462).

FIG. 4G further illustrates various reference points between different servers, functions, or communication nodes of the CIoT network architecture 400G. Some example reference points related to MTC-IWF 474 and SCEF 472 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 474 and the SMS-SC 466 in the HPLMN), T6a (a reference point used between SCEF 472 and serving MME 423), T6b (a reference point used between SCEF 472 and serving SGSN 460), T8 (a reference point used between the SCEF 472 and the SCS/AS 462/460), S6m (a reference point used by MTC-IWF 474 to interrogate HSS/HLR 477), S6n (a reference point used by MTC-AAA server 464 to interrogate HSS/HLR 477), and S6t (a reference point used between SCEF 472 and HSS/HLR 477).

In some aspects, the CIoT UE 401/403 can be configured to communicate with one or more entities within the CIoT architecture 400G via the RAN 488 (e.g., CIoT RAN) according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the CIoT UE 401/403 and an Evolved Packet System (EPS) Mobile Management Entity (MME) 484 and SGSN 482. In some aspects, the CIoT network architecture 400G can include a packet data network, an operator network, or a cloud service network, having, for example, among other things, a Service Capability Server (SCS) 480, an Application Server (AS) 460, or one or more other external servers or network components.

The RAN 488 can be coupled to the HSS/HLR servers 477 and the AAA servers 464 using one or more reference points including, for example, an air interface based on an S6a reference point, and configured to authenticate/authorize CIoT UE 401/403 to access the CIoT network. The RAN 488 can be coupled to the CIoT network architecture 400G using one or more other reference points including, for example, an air interface corresponding to an SGi/Gi interface for 3GPP accesses. The RAN 488 can be coupled to the SCEF 472 using, for example, an air interface based on a T6a/T6b reference point, for service capability exposure. In some aspects, the SCEF 472 may act as an API GW towards a third-party application server such as AS 460. The SCEF 472 can be coupled to the HSS/HLR 477 and MTC AAA 464 servers using an S6t reference point, and can further expose an Application Programming Interface to network capabilities.

In certain examples, one or more of the CIoT devices disclosed herein, such as the CIoT UE 401/403, the CIoT RAN 488, etc., can include one or more other non-CIoT devices, or non-CIoT devices acting as CIoT devices, or having functions of a CIoT device. For example, the CIoT UE 401/403 can include a smart phone, a tablet computer, or one or more other electronic device acting as a CIoT device for a specific function, while having other additional functionality. In some aspects, the RAN 488 can include a CIoT enhanced Node B (CIoT eNB) (not shown in FIG. 4G) communicatively coupled to the CIoT Access Network Gateway (CIoT GW) 495. In certain examples, the RAN 488 can include multiple base stations (e.g., CIoT eNBs) connected to the CIoT GW 495, which can include MSC 486, MME 484, SGSN 482, or S-GW 480. In certain examples, the internal architecture of RAN 488 and CIoT GW 495 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 4H:
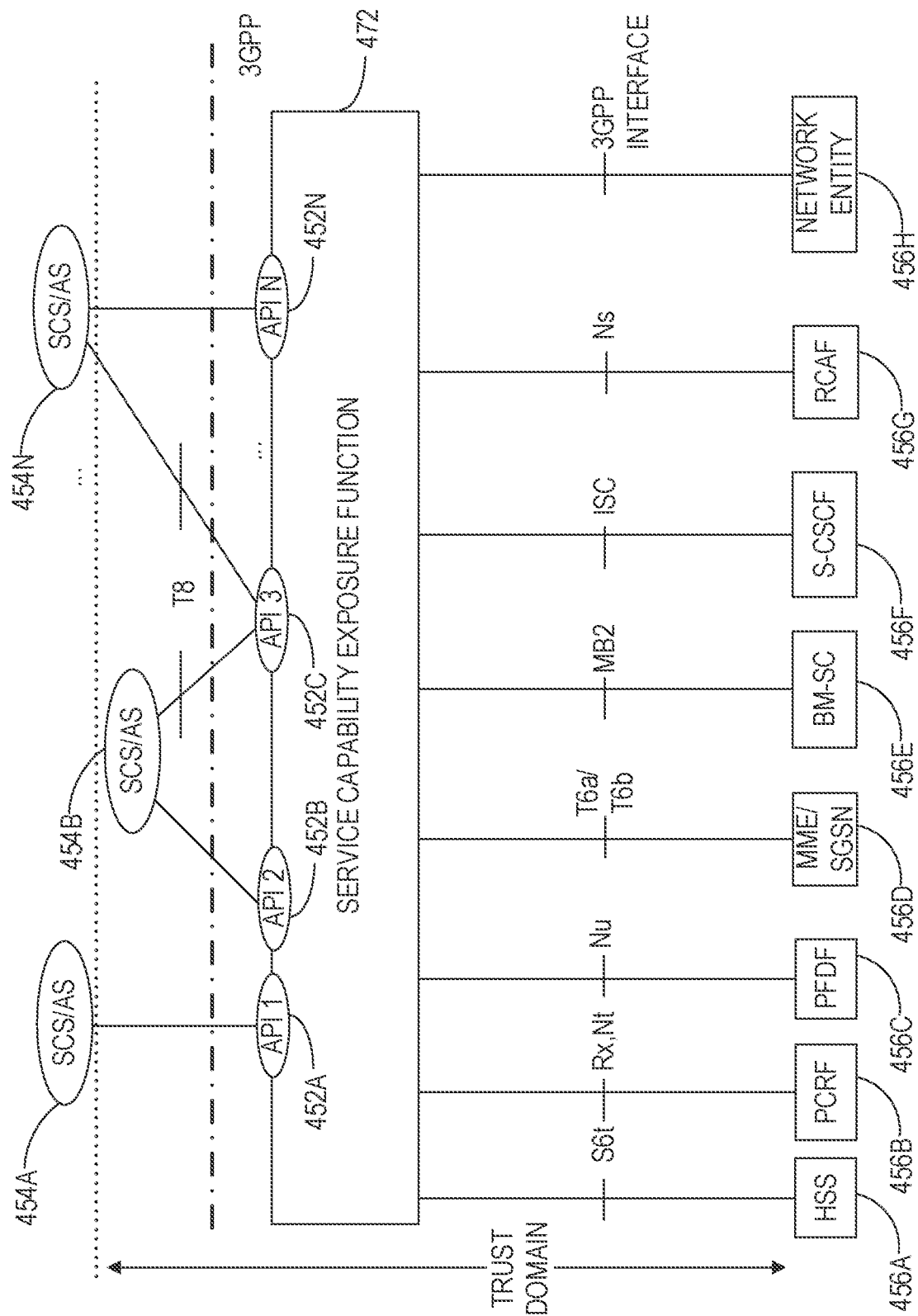
FIG. 4H illustrates an example Service Capability Exposure Function (SCEF) in accordance with some aspects.
Figure 41:
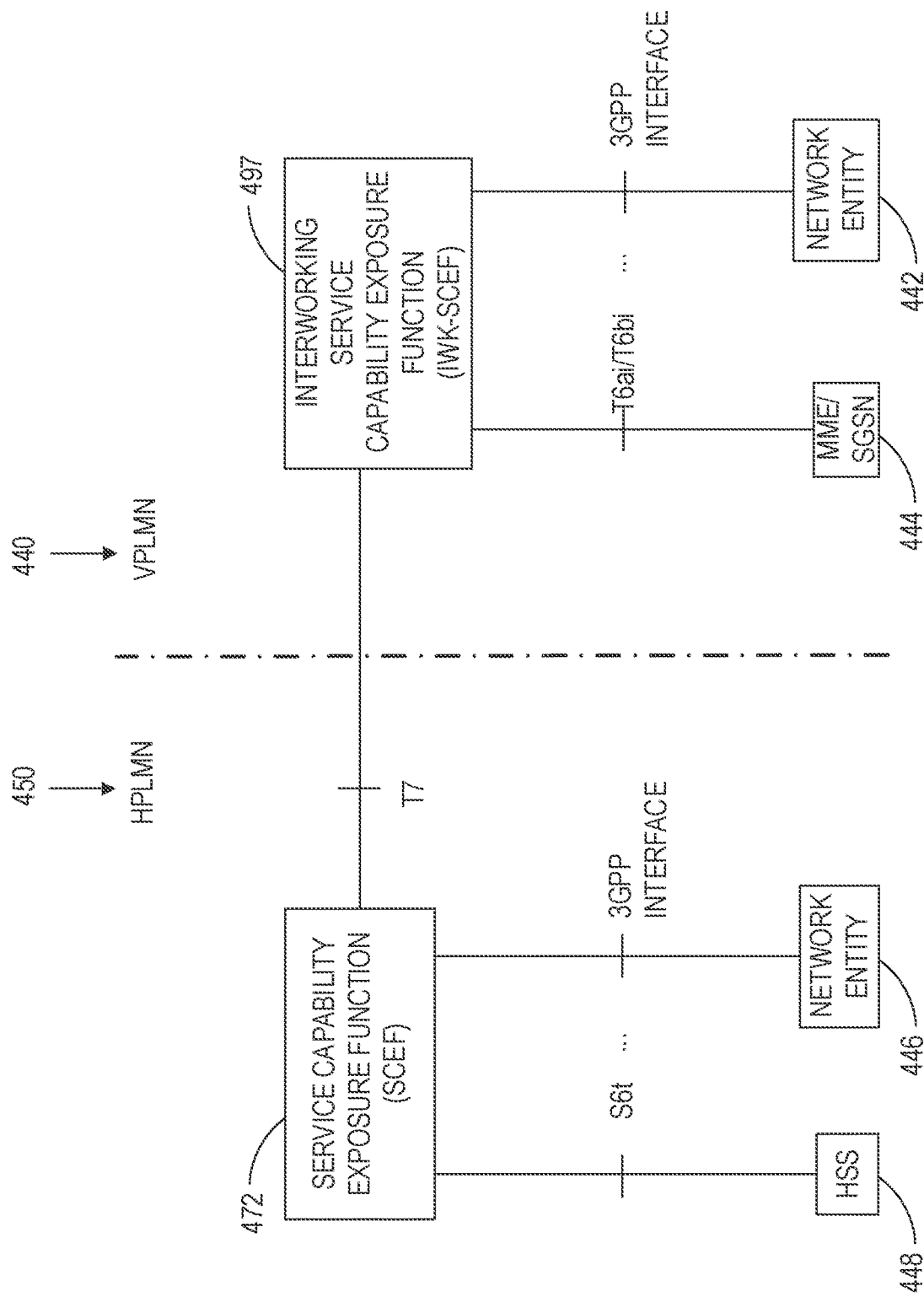

FIG. 4H illustrates an example Service Capability Exposure Function (SCEF) in accordance with some aspects. Referring to FIG. 4H, the SCEF 472 can be configured to expose services and capabilities provided by 3GPP network interfaces to external third party service provider servers hosting various applications. In some aspects, a 3GPP network such as the CIoT architecture 400G, can expose the following services and capabilities: a home subscriber server (HSS) 456A, a policy and charging rules function (PCRF) 456B, a packet flow description function (PFDF) 456C a MME/SGSN 456D, a broadcast multicast service center (BM-SC) 456E, a serving call server control function (S-CSCF) 456F, a RAN congestion awareness function (RCAF) 456G, and one or more other network entities 456H. The above-mentioned services and capabilities of a 3GPP network can communicate with the SCEF 472 via one or more interfaces as illustrated in FIG. 4H. The SCEF 472 can be configured to expose the 3GPP network services and capabilities to one or more applications running on one or more service capability server (SCS)/application server (AS), such as SCS/AS 454A, 454B, . . . , 454N. Each of the SCS/AG 454A-454N can communicate with the SCEF 472 via application programming interfaces (APIs) 452A, 452B, 452C, . . . , 452N, as seen in FIG. 4H.

FIG. 4I illustrates an example roaming architecture for SCEF (e.g., 472) in accordance with some aspects. Referring to FIG. 4I, the SCEF 472 can be located in HPLMN 450 and can be configured to expose 3GPP network services and capabilities, such as 448, . . . , 446. In some aspects, 3GPP network services and capabilities, such as 444, . . . , 442, can be located within VPLMN 440. In this case, the 3GPP network services and capabilities within the VPLMN 440 can be exposed to the SCEF 472 via an interworking SCEF (IWK-SCEF) 497 within the VPLMN 440.

Figure 4J:
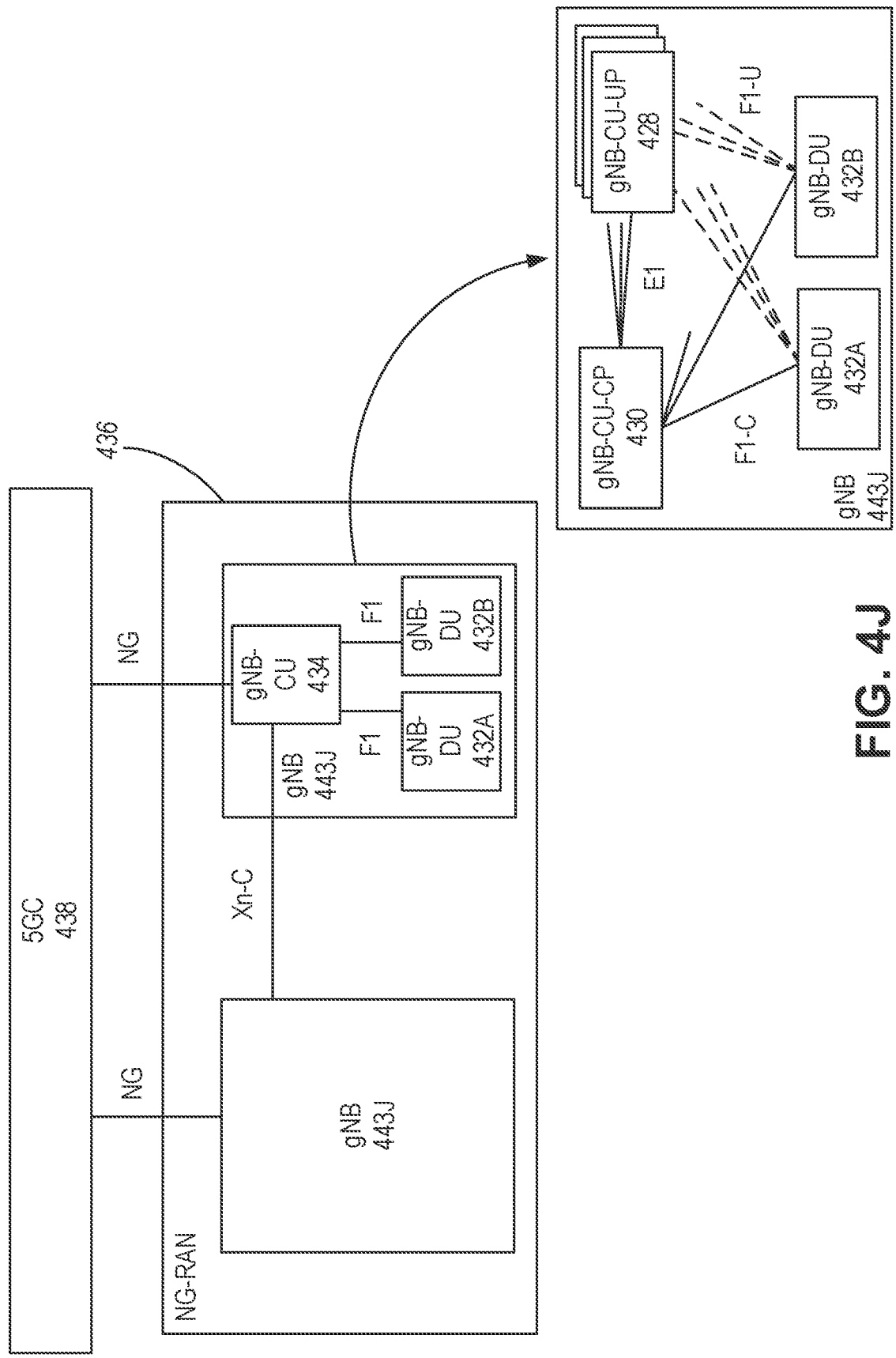
FIG. 4J illustrates components of an exemplary NG Radio Access Network (RAN) architecture, in accordance with some aspects.

FIG. 4J illustrates an exemplary Next-Generation Radio Access Network architecture, in accordance with some aspects. The 5GC 438, the NG-RAN 436, and the gNBs 443J, in some aspects, may be similar or the same as the 5GC 420, the NG-RAN 436, and the gNBs 443A/443B of FIG. 4B, respectively. In some aspects, network elements of the NG-RAN 436 may be split into central and distributed units, and different central and distributed units, or components of the central and distributed units, may be configured for performing different protocol functions. For example, different protocol functions of the protocol layers depicted in FIG. 6, FIG. 9, or FIG. 10.

In some aspects, the gNB 443J can comprise or be split into one or more of a gNB Central Unit (gNB-CU) 434 and a gNB Distributed Unit (gNB-DU) 432A/432B. Additionally, the gNB 443J can comprise or be split into one or more of a gNB-CU-Control Plane (gNB-CU-CP) 430 and a gNB-CU-User Plane (gNB-CU-UP) 428. The gNB-CU 434 is a logical node configured to host the radio resource control layer (RRC), service data adaptation protocol (SDAP) layer and packet data convergence protocol layer (PDCP) protocols of the gNB or RRC, and PDCP protocols of the E-UTRA-NR gNB (en-gNB) that controls the operation of one or more gNB-DUs. The gNB-DU 432A/432B is a logical node configured to host the radio link control layer (RLC), medium access control layer (MAC) and physical layer (PHY) layers of the gNB 443A/443B, 443J or en-gNB, and its operation is at least partly controlled by gNB-CU 434. In some aspects, one gNB-DU 432A/432B can support one or multiple cells.

The gNB-CU 434 comprises a gNB-CU-Control Plane (gNB-CU-CP) 430 and a gNB-CU-User Plane (gNB-CU-UP) 428. The gNB-CU-CP 430 is a logical node configured to host the RRC and the control plane part of the PDCP protocol of the gNB-CU 434 for an en-gNB or a gNB. The gNB-CU-UP 428 is a logical node configured to host the user plane part of the PDCP protocol of the gNB-CU 434 for an en-gNB, and the user plane part of the PDCP protocol and the SDAP protocol of the gNB-CU 434 for a gNB.

The gNB-CU 434 and the gNB-DU 432A/432B can communicate via the F1 interface and the gNB 443J can communicate with the gNB-CU via the Xn-C interface. The gNB-CU-CP 430 and the gNB-CU-UP 428 can communicate via the E1 interface. Additionally, the gNB-CU-CP 430 and the gNB-DU 432A/432B can communicate via the F1-C interface, and the gNB-DU 432A/432B and the gNB-CU-UP 428 can communicate via the F1-U interface.

In some aspects, the gNB-CU 434 terminates the F1 interface connected with the gNB-DU 432A/432B, and in other aspects, the gNB-DU 432A/432B terminates the F1 interface connected with the gNB-CU 434. In some aspects, the gNB-CU-CP 430 terminates the E1 interface connected with the gNB-CU-UP 428 and the F1-C interface connected with the gNB-DU 432A/432B. In some aspects, the gNB-CU-UP 428 terminates the E1 interface connected with the gNB-CU-CP 430 and the F1-U interface connected with the gNB-DU 432A/432B.

In some aspects, the F1 interface is a point-to-point interface between endpoints and supports the exchange of signaling information between endpoints and data transmission to the respective endpoints. The F1 interface can support control plane and user plane separation and separate the Radio Network Layer and the Transport Network Layer. In some aspects, the E1 interface is a point-to-point interface between a gNB-CU-CP 430 and a gNB-CU-UP 428 and supports the exchange of signaling information between endpoints. The E1 interface can separate the Radio Network Layer and the Transport Network Layer, and in some aspects, the E1 interface may be a control interface not used for user data forwarding.

Referring to the NG-RAN 436, the gNBs 443J of the NG-RAN 436 may communicate to the 5GC via the NG interfaces, and interconnected to other gNBs via the Xn interface. In some aspects, the gNBs 443J (e.g., 443A/443B) can be configured to support FDD mode, TDD mode or dual mode operation. In certain aspects, for EN-DC, the S1-U interface and an X2 interface (e.g., X2-C interface) for a gNB, consisting of a gNB-CU and gNB-DUs, can terminate in the gNB-CU.

Figure 5A:
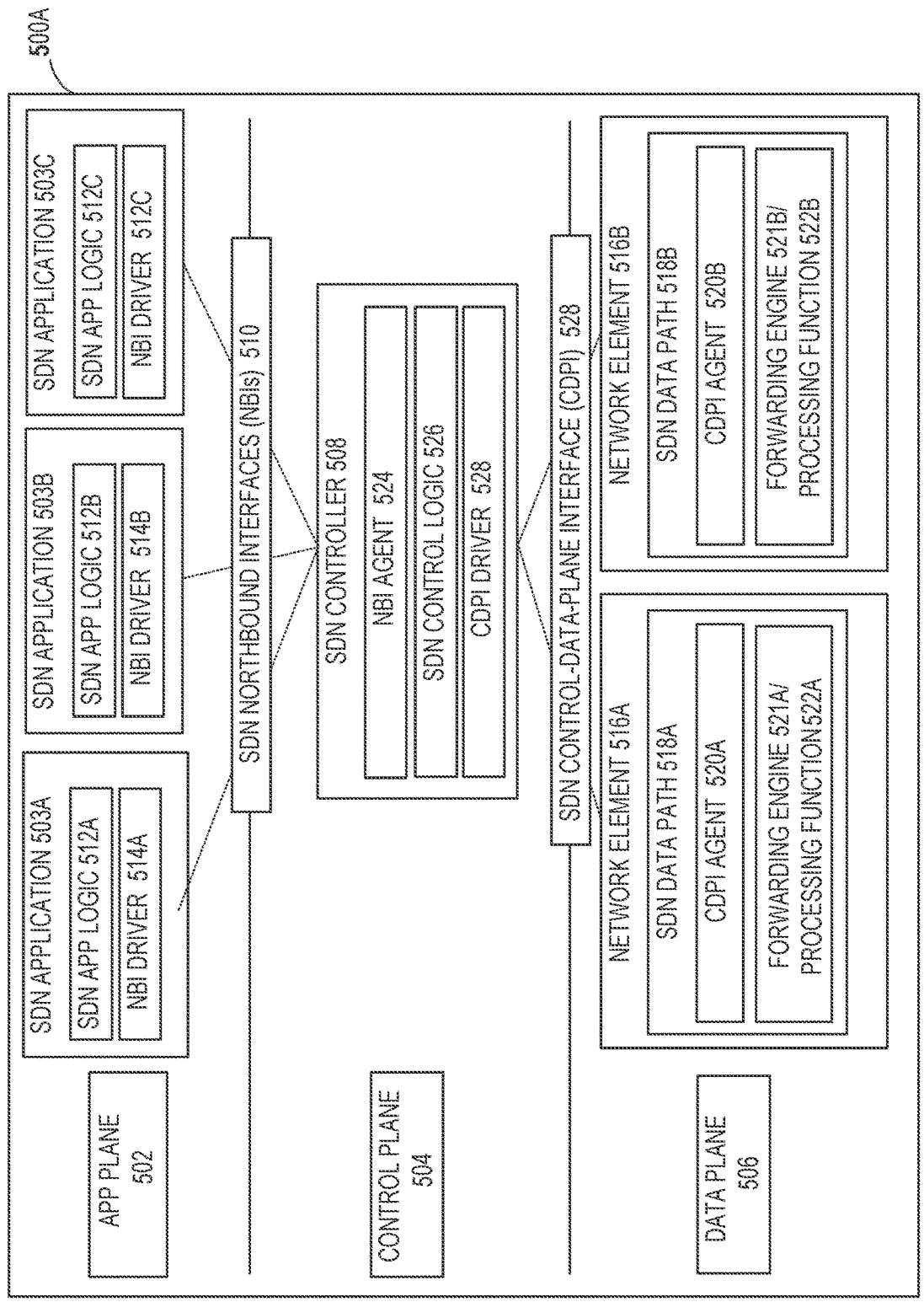
FIG. 5A is a block diagram of an exemplary SDN architecture, in accordance with some aspects.

FIG. 5A is a block diagram of an SDN architecture 500A, in accordance with some aspects. The SDN architecture 500A can be implemented within any of the systems shown in FIG. 1, 3, or 4A-4J, and can be configured for SDN-based or NFV-based data re-direction operations. The SDN architecture 500A comprises an application plane 502, a control plane 504, and a data plane 506. The application plane 502 may include one or more SDN applications (e.g., 503A, 503B, 503C), the SDN control plane 504 can include a network controller (e.g., SDN controller 508), and the SDN data plane 506 can include one or more network elements 516A and 516B. Some non-limiting examples of SDN applications 503A-503C can include software-defined mobile networking (SDMN), software-defined wide area network (SD-WAN), software-defined local area network (SD-LAN), network-related security applications, and distributed applications for group data delivery.

In some aspects, the SDN applications 503A-503C may be programs that can directly communicate in a programmatic manner to the SDN controller 508, for example, to communicate network requirements and desired network behavior. The SDN applications 503A-C can communicate with the SDN controller 508 via a northbound interface (NBI) 510. The SDN applications 503A-C can make decisions and determine operations, for example, based on an abstracted view of a network. In some aspects, an SDN application 503A-C comprises SDN application logic 512 and one or more NBI drivers 514.

The SDN controller 508 is a centralized logic entity that can coordinate communications and requested information from the SDN application plane 502 to the SDN data plane 506. The SDN controller 508 can provide an abstracted view of the network to an SDN application 503, and this abstracted view may include information describing certain network events as well as statistics. The SDN controller 508 may comprise an NBI agent 524, SDN control logic 526, and a control-data-plane interface (CDPI) driver 528. The SDN controller 508 may communicate with the one or more network elements 516A-516B via the SDN CDPI 528. The SDN CDPI 528 can enable capabilities advertisement, statistics reporting, event notification, and programmatic control of forwarding operations.

A network element, for example, can be device within the network, such as a router, switch, RAN node, or a gateway. A network element 516 may comprise an SDN data path 518, a logical device of a network that includes forwarding and data processing capabilities. The SDN data path 518 can include an SDN CDPI agent 520, a forwarding engine 521, and a processing function 522, which can enable internal traffic processing or terminations for the network element 516 (e.g., SDN data path 518), and forwarding between external interfaces of the SDN data path 518. In certain aspects, the forwarding engine 521 and processing function 522 may be included in the SDN data path 518 as a set. The SDN data path 518 may comprise combined physical resources, such as circuitry, and one or more SDN data paths may be included within a single network element or defined across multiple network elements.

Figure 5B:
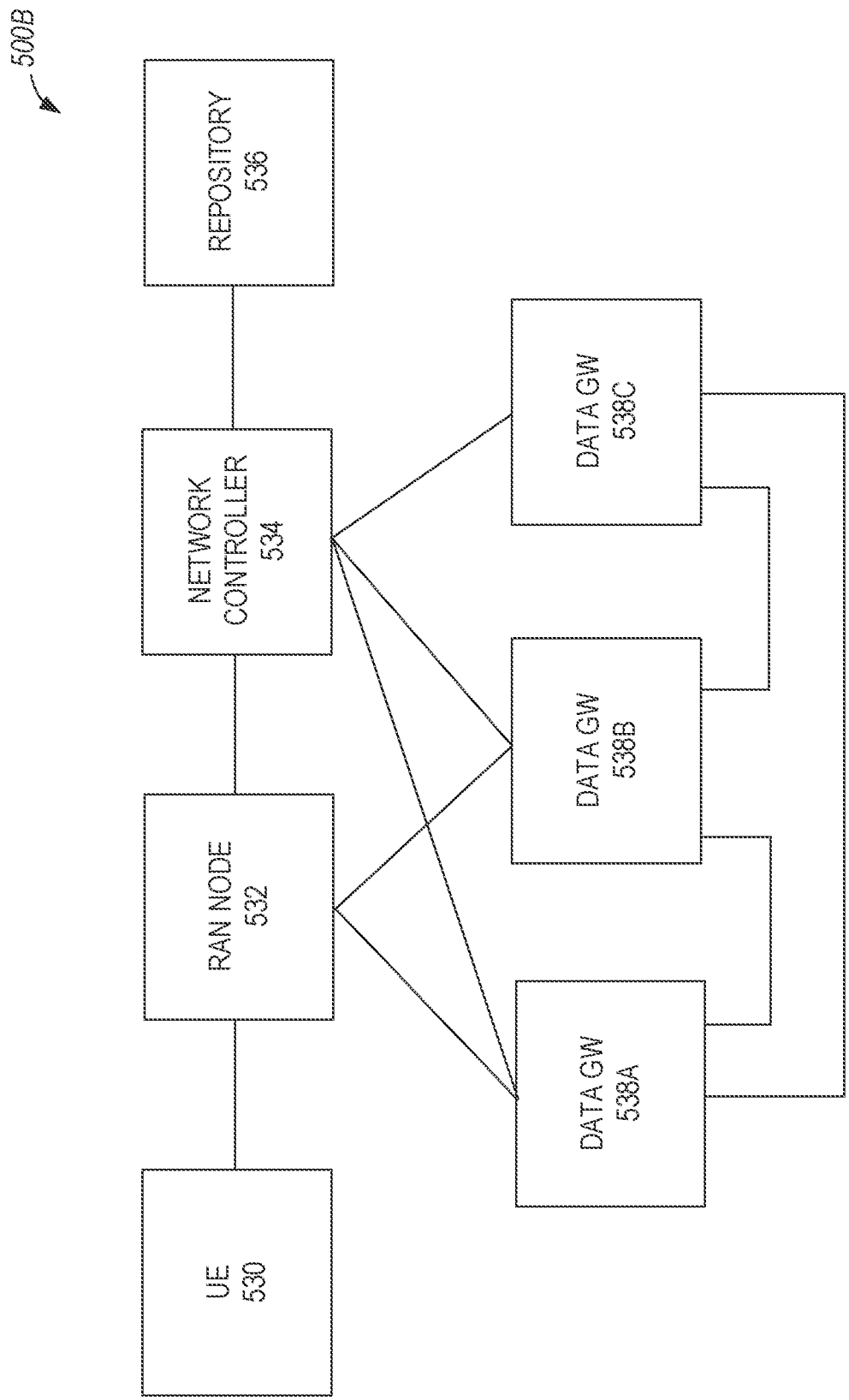
FIG. 5B is a block diagram of an exemplary SDN architecture, in accordance with some aspects.
Figure 5C:
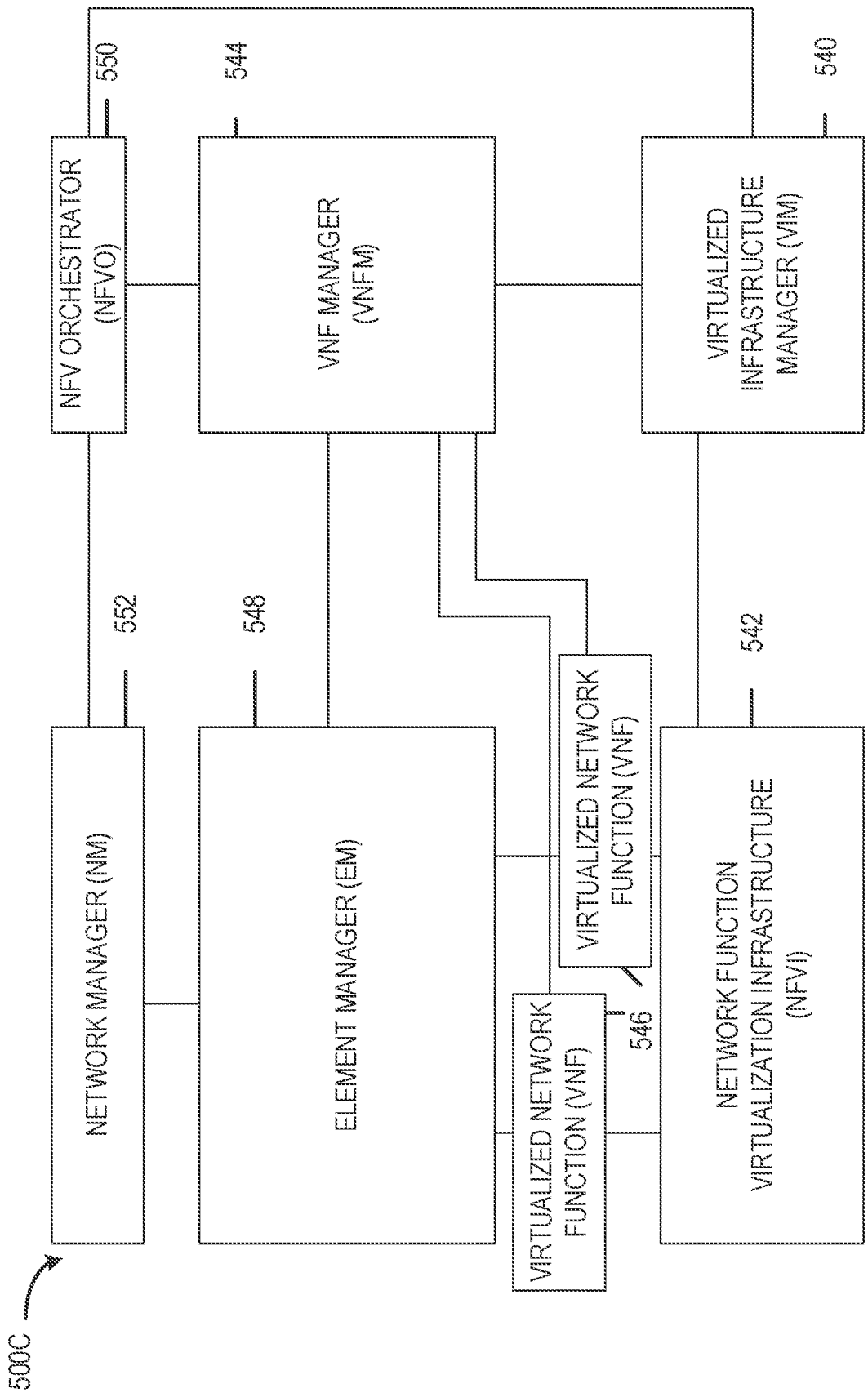
FIG. 5C is a block diagram illustrating components, according to some example aspects, of a system to support network function virtualization.

FIG. 5B is a block diagram of an SDN architecture 500B, in accordance with some aspects. The SDN architecture 500B can be implemented within any of the systems shown in FIG. 1, 3, or 4A-4J, and can be configured for SDN-based or NFV-based data re-direction operations. In some aspects, the UE 530 (e.g., UE 401/403) may communicate with a network (e.g., system 400A, system 400B, system 400C) to access various IP services. In some aspects, the architecture of the network can be SDN-based and configured to include a control plane separated from user plane entities or functions (e.g., network elements). A tunnel-less transmission can be used for provisioning IP services for various devices to reduce messaging overhead. The UE 530 can access the network via a RAN node 532. The RAN node 532 can communicate with a network controller 534 to request IP services provisioning for the UE 530. In certain aspects, the network controller 534 may be an SDN-based network controller. The network controller 534 can communicate with a repository 536 (e.g., subscription repository) to authenticate the UE 530, and the subscription repository 536 can be configured to store (e.g., in memory) device and service subscription information (e.g., device and service subscription information for the UE 530).

In various aspects, the RAN node 532, the network controller 534, or a combination of the RAN node 532 and the network controller 534, can provision a requested IP service (e.g., requested by the UE 530). IP service provisioning can include allocating a group of IP addresses. For example, a pool of IPv4 addresses or an IPv6 prefix may be allocated for a requested IP service. In some aspects, a mobile network operator (MNO) can preconfigure the group of IP addresses. The preconfigured group of IP addresses may be stored, for example, within memory of one or more of the subscription repository 536, the network controller 534, or the RAN node 532. If the RAN node 532 allocates the group of IP addresses, the RAN node 532 may request the group of IP addresses from the network controller 534.

The network controller 534 can request the group of IP addresses from the subscription repository 536. A device, such as the RAN node 532, network controller 534, or a router can identify a requested IP service by a group of IP addresses (e.g., the allocated group of IP addresses) and can use an IP address of a packet to identify a received packet and determine a routing policy for forwarding the packet to an appropriate data gateway (e.g., data gateway 538A, data gateway 538B, data gateway 538C), router, or an endpoint (e.g., 104B).

The network controller 534 can also configure devices, such as one or more data gateways (e.g., 538A, 538B, and 108) or routers (e.g., 106), for operations related to the requested IP service in a particular packet data network (PDN). For example, the network controller 534 can configure such devices with routing tables (e.g., flow tables, forwarding tables) for implementing a routing policy. In some aspects, the routing policies may be based on information regarding the PDN. As part of the data gateway configuration, the network controller 534 may provide routing policies to the RAN node 532, the data gateways, or the routers (e.g., 106). In some aspects, if the RAN node 532 receives the routing policies, the RAN node 532 may provide the routing policies to the data gateways.

In some aspects, the SDN architecture 500A can provide one or more network elements as virtualized services, for example, a controller (e.g., SDN controller), router, switch, RAN node, gateway, or various other network elements. These can be virtualized services of system 100, system 300, or systems 400A and 400B.

In some aspects, virtualized network elements can be implemented in different planes of the SDN architecture 500A. For example, the SDN architecture 500A can include a router (e.g., virtualized router), switch (e.g., virtualized switch), or other virtualized network elements that are implemented in the data plane 506 of the SDN architecture 500A. The SDN architecture 500A can also include a controller (e.g., SDN controller), or other virtualized network elements that are implemented in the control plane 504 of the SDN architecture 500A.

In some aspects, the SDN architecture 500A, including the virtualized network elements or services, can also provide virtualized network functions. Network function virtualization (NFV) can facilitate programmability and flexibility of network functions, such as functions performed by virtualized network elements (e.g., routers, switches, controllers, etc.). In some aspects, such virtualized functions can include SDN data re-direction operations, as described herein.

In an SDN (e.g., SDN architecture 500A), virtualized network elements in the control plane 504, such as the SDN controller, can maintain and configure a global state of the network. The virtualized network elements (e.g., virtualized network functions) in the data plane 506, such as a virtualized router or switch (e.g., virtualized router functionality or virtualized switching functionality), can operate as a data path configured for receiving data packets, identifying destination addresses for the data packets, and forwarding the data packets according to the identified destination addresses. In some aspects, such virtualized network elements can identify the destination addresses by referring to forwarding or routing tables that can include information that is structured according to routing policies and rules. Routing policies and rules may be established by network entities within the control plane, for example, the SDN controller.

An example of a virtualized function that can be performed within the SDN architecture 500A or NFV system 1300 includes SDN data re-direction. In some aspects, SDN data re-direction operations can include the SDN router or SDN controller storing and updating an SDN relocation table. In some aspects, the SDN relocation table can be stored within memory at the SDN router or switch. The SDN relocation table can be stored as part of the SDN domain and accessible by the SDN router or switch, or other network entities (e.g., virtualized functions). The SDN relocation table can include information to override a routing policy (e.g., forwarding or routing table configured according to a routing policy) that was previously configured by the control plane, such as the SDN controller.

FIG. 5C is a block diagram illustrating components, according to some example aspects, of a system 500C to support NFV. The NFV system 500C, can include virtualized functions of the network entities of one or more of systems 100, 300, or the systems shown in FIGS. 4A-4J. In some aspects, the NFV system 500C can include virtualized functions of the SDN network architecture of system 500A or 500B. Virtualized functions can include routing or switching functions for data re-direction operations as described herein. In some aspects, virtualized functions can also include functions of access points (e.g., BSs, Eps) and functions of gateways, for the data re-direction operations.

The system 500C is illustrated as including a virtualized infrastructure manager (VIM) 540, a network function virtualization infrastructure (NFVI) 542, a VNF manager (VNFM) 544, virtualized network functions (VNFs) 546, an element manager (EM) 548, an NFV Orchestrator (NFVO) 550, and a network manager (NM) 552.

The VIM 540 manages the resources of the NFVI 542. The NFVI 542 can include physical or virtual resources and applications (e.g., including hypervisors) used to execute the system 500C. The VIM 540 can manage the life cycle of virtual resources with the NFVI 542 (e.g., creation, maintenance, and tear down of virtual machines (VMs) associated with one or more physical resources), track VM instances, track performance, fault and security of VM instances and associated physical resources, and expose VM instances and associated physical resources to other management systems. The VNFM 544 can manage the VNFs 546, and can configure and control network resources (e.g., in the SDN domain). The VNFs 546 can be used to execute EPC or 5GC components/functions and RAN components/functions. For example, the VNFs 546 can be used to execute routing or switching functionalities and controller functionalities associated with the data re-routing operations. The VNFM 544 can manage the life cycle of the VNFs 546 and track performance, fault and security of the virtual aspects of VNFs 546. The EM 548 can track the performance, fault and security of the functional aspects of VNFs 546. The tracking data from the VNFM 544 and the EM 548 may comprise, for example, performance measurement (PM) data used by the VIM 540 or the NFVI 542. Both the VNFM 544 and the EM 548 can scale up/down the quantity of VNFs of the system 500C.

The NFVO 550 can coordinate, authorize, release and engage resources of the NFVI 542 in order to provide the requested service (e.g., to execute an EPC function, component, or slice). The NM 552 may provide a package of end-user functions with the responsibility for the management of a network, which may include network elements with VNFs, non-virtualized network functions, or both (management of the VNFs may occur via the EM 548). In some aspects, the VNFM 544 can manage virtualized functions of a network router or switch (e.g., router or switch 106A), and a network controller (e.g., SDN controller 508, network controller 534). In certain aspects, the virtualized router or switch functions can exist in the data plane of the SDN domain (e.g., data plane 506 in SDN architecture 500A) and the controller functions can exist in the control plane of the SDN domain (control plane 504 in SDN architecture 500A).

In some aspects, the VNFM 544 can manage virtualized router or switch functions that can include generating, maintaining, and updating a relocation table for data re-directing (e.g., short-lived SDN relocation table). The virtualized router or switch function can update the relocation table based on a threshold condition or trigger, including an indication of a handover (e.g., completed handover, or predicted handover) and handover prediction information, as described herein. In some aspects, the virtualized router function can receive handover prediction data from various other virtualized functions of the SDN network, or from entities outside of the network. For example, a LQP server can be configured to collect various network data and transmit handover prediction information based on such data.

Figure 6:
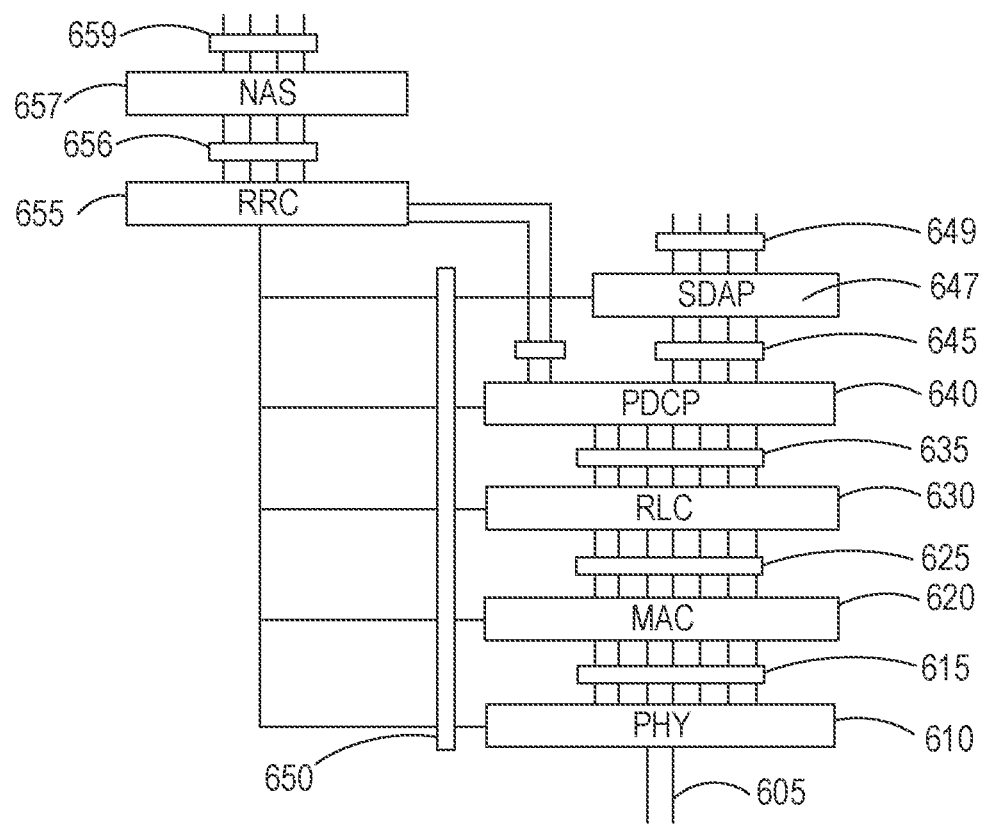
FIG. 6 is an illustration of an exemplary user plane protocol stack in accordance with some aspects.

FIG. 6 illustrates protocol functions that may be implemented within or by devices of a network architecture, in accordance with some aspects. For example, such protocol functions may be implemented within wireless communication devices such as UEs or BSs, and any other network entities configured for SDN data re-direction operations. In some aspects, protocol layers may include one or more of physical layer (PHY) 610, medium access control layer (MAC) 620, radio link control layer (RLC) 630, packet data convergence protocol layer (PDCP) 640, service data adaptation protocol (SDAP) layer 647, radio resource control layer (RRC) 655, and non-access stratum (NAS) layer 657, in addition to other higher layer functions not illustrated. In some aspects, the protocol layers may be implemented within or by any of the network components of FIGS. 4A-4J, such as the gNBs (e.g., 443A/443B, 443J), and various layers of the protocol functions may be implemented by one or more central or distributed units of the gNBs (e.g., gNB-CU 429J, gNB-DU 430J).

According to some aspects, protocol layers may include one or more service access points that may provide communication between two or more protocol layers. According to some aspects, PHY 610 may transmit and receive physical layer signals 605 that may be received or transmitted respectively by one or more other communication devices (e.g., UE 401, UE 401/403, device 700). According to some aspects, physical layer signals 605 may comprise one or more physical channels.

According to some aspects, an instance of PHY 610 may process requests from and provide indications to an instance of MAC 620 via one or more physical layer service access points (PHY-SAP) 615. According to some aspects, requests and indications communicated via PHY-SAP 615 may comprise one or more transport channels. According to some aspects, an instance of MAC 620 may process requests from and provide indications to an instance of RLC 630 via one or more medium access control service access points (MAC-SAP) 625. According to some aspects, requests and indications communicated via MAC-SAP 625 may comprise one or more logical channels.

According to some aspects, an instance of RLC 630 may process requests from and provide indications to an instance of PDCP 640 via one or more radio link control service access points (RLC-SAP) 635. According to some aspects, requests and indications communicated via RLC-SAP 635 may comprise one or more RLC channels. According to some aspects, an instance of PDCP 640 may process requests from and provide indications to one or more of an instance of RRC 655 and one or more instances of SDAP 647 via one or more packet data convergence protocol service access points (PDCP-SAP) 645. According to some aspects, requests and indications communicated via PDCP-SAP 645 may comprise one or more radio bearers.

According to some aspects, an instance of SDAP 647 may process requests from and provide indications to one or more higher layer protocol entities via one or more service data adaptation protocol service access points (SDAP-SAP) 649. According to some aspects, requests and indications communicated via SDAP-SAP 649 may comprise one or more quality of service (QoS) flows. According to some aspects, RRC entity 655 may configure, via one or more management service access points (M-SAP) 650, aspects of one or more protocol layers, which may include one or more instances of PHY 610, MAC 620, RLC 630, PDCP 640, and SDAP 647. According to some aspects, an instance of RRC 655 may process requests from and provide indications to one or more NAS 657 entities via one or more RRC service access points (RRC-SAP) 656. According to some aspects, a NAS entity 657 may process requests from and provide indications to one or more higher layer protocol entities via one or more NAS service access points (NAS-SAP) 659.

Figure 7:
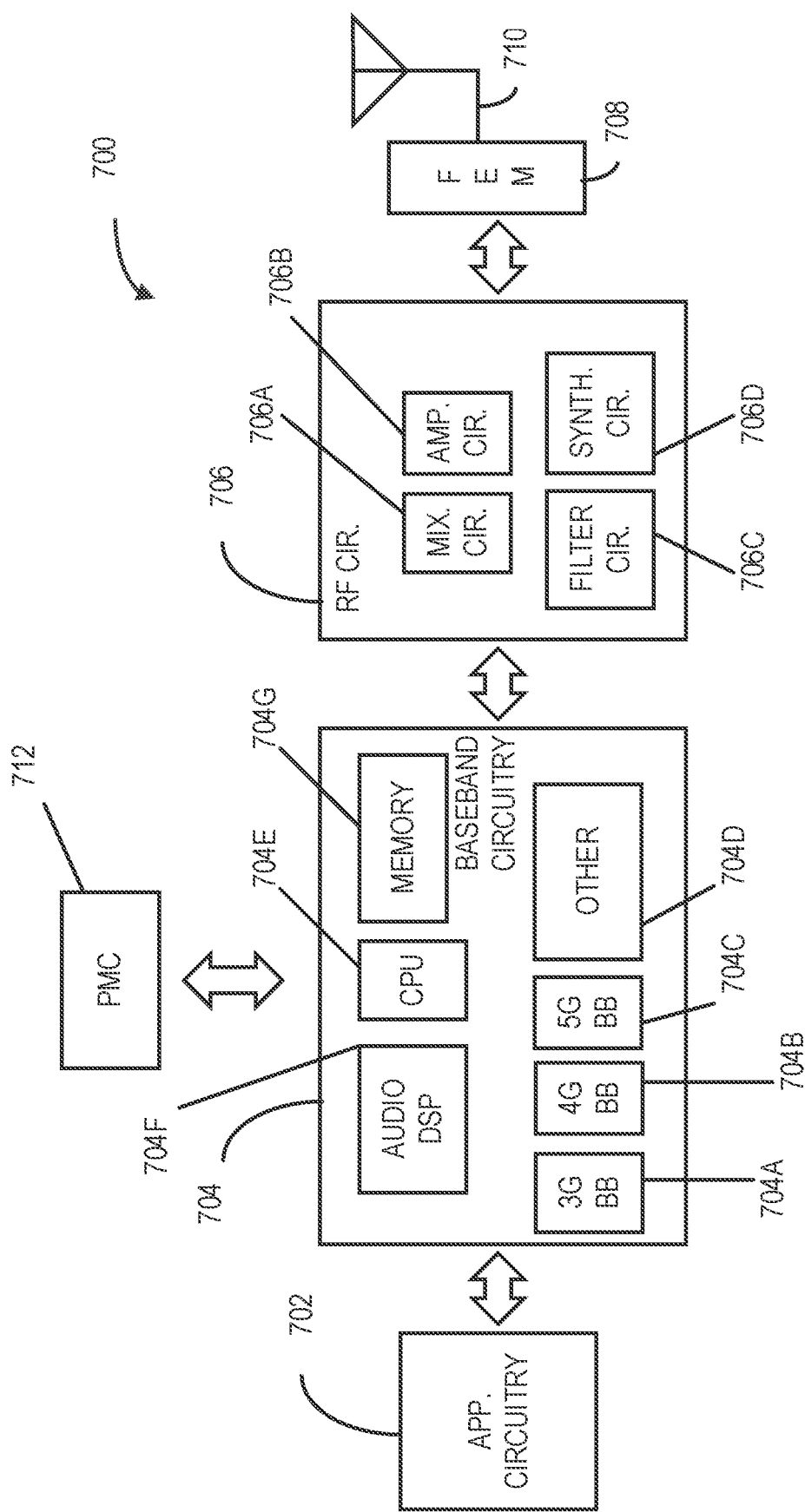
FIG. 7 illustrates example components of a device in accordance with some aspects.

FIG. 7 illustrates example components of a device 700 in accordance with some aspects. For example, the device 700 may be a device configured for SDN data re-direction operations (e.g., UE 401, UE 403, UE 660, RAN Node 413/415). In some aspects, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE (e.g., UE 401, UE 403, UE 660) or a RAN node (e.g., Macro RAN node 413, LP RAN node 415, gNB 680). In some aspects, the device 700 may include fewer elements (e.g., a RAN node may not utilize application circuitry 702, and instead may include a processor/controller to process IP data received from an EPC). In some aspects, the device 700 may include additional elements such as, for example, memory/storage, display, camera, sensor, or input/output (I/O) interface. In other aspects, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some aspects, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some aspects, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706.

In other aspects, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some aspects, modulation/demodulation circuitry of the baseband circuitry 704 may include Fast-Fourier Transform (FFT), precoding, or constellation mapping/demapping functionality. In some aspects, encoding/decoding circuitry of the baseband circuitry 704 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 704 may include one or more audio digital signal processor(s) (DSP) 704F. The audio DSP(s) 704F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 704 and the application circuitry 702 may be implemented together such as, for example, on a system on a chip (SOC).

In some aspects, the baseband circuitry 704 may provide for communication compatible with one or more radio technologies. For example, in some aspects, the baseband circuitry 704 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various aspects, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some aspects, the receive signal path of the RF circuitry 706 may include mixer circuitry 706A, amplifier circuitry 706B and filter circuitry 706C. In some aspects, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some aspects, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some aspects, the output baseband signals may be zero-frequency baseband signals, although this is not a requirement. In some aspects, mixer circuitry 706A of the receive signal path may comprise passive mixers, although the scope of the aspects is not limited in this respect.

In some aspects, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by filter circuitry 706C. In some aspects, the mixer circuitry 706A of the receive signal path and the mixer circuitry 706A of the transmit signal path may include two or more mixers and may be arranged for quadrature down-conversion and up-conversion, respectively. In some aspects, the mixer circuitry 706A of the receive signal path and the mixer circuitry 706A of the transmit signal path may include two or more mixers and may be arranged for image rejection (e.g., Hartley image rejection). In some aspects, the mixer circuitry 706A of the receive signal path and the mixer circuitry 706A may be arranged for direct down-conversion and direct up-conversion, respectively. In some aspects, the mixer circuitry 706A of the receive signal path and the mixer circuitry 706A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode aspects, a separate radio IC circuitry may be provided for processing signals for each spectrum, although the scope of the aspects is not limited in this respect. In some aspects, the synthesizer circuitry 706D may be a fractional-N synthesizer or a fractional N/N+1 synthesizer, although the scope of the aspects is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider. The synthesizer circuitry 706D may be configured to synthesize an output frequency for use by the mixer circuitry 706A of the RF circuitry 706 based on a frequency input and a divider control input. In some aspects, the synthesizer circuitry 706D may be a fractional N/N+1 synthesizer.

In some aspects, frequency input may be provided by a voltage-controlled oscillator (VCO), although that is not a requirement. Divider control input may be provided by either the baseband circuitry 704 or the applications processor 702 depending on the desired output frequency. In some aspects, a divider control input (e.g., N) may be determined from a look-up table based on a channel indicated by the applications processor 702.

Synthesizer circuitry 706D of the RF circuitry 706 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 706D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency ($f_{LO}$). In some aspects, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various aspects, the amplification through the transmit or receive signal paths may be done solely in the RF circuitry 706, solely in the FEM 708, or in both the RF circuitry 706 and the FEM 708.

In some aspects, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some aspects, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other aspects, the PMC 712 may be additionally or alternatively coupled with, and perform similar power management operations for, other components such as, but not limited to, application circuitry 702, RF circuitry 706, or FEM 708.

In some aspects, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Figure 10:
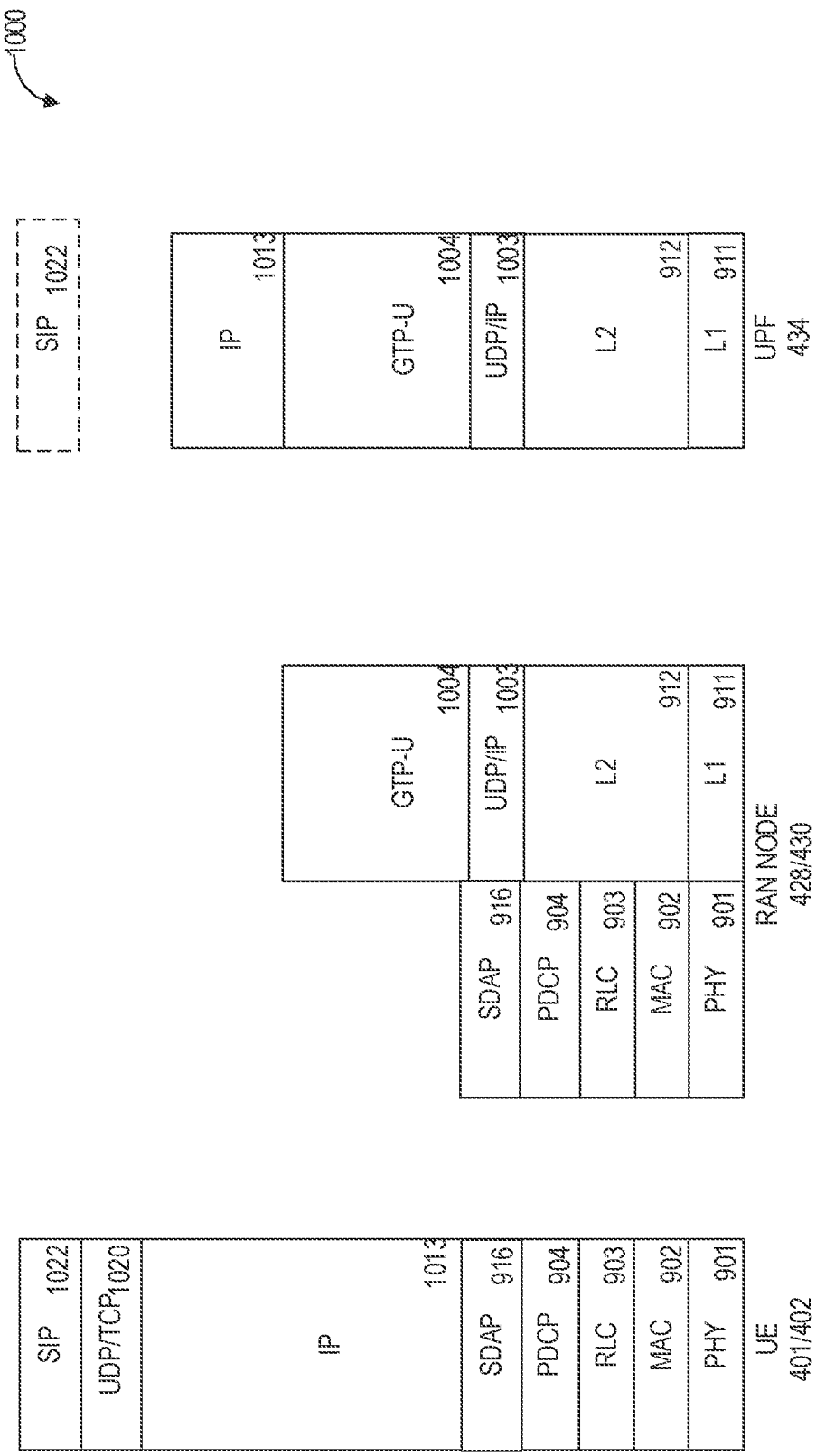
FIG. 10 is an illustration of an exemplary user plane protocol stack in accordance with some aspects.

Processors of the application circuitry 702 and processors of the baseband circuitry 704 may be used to execute elements of one or more instances of a protocol stack (e.g., protocol stack described with respect to FIG. 6, FIG. 9, or FIG. 10). For example, processors of the baseband circuitry 704, alone or in combination, may be used execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 655, 905). As referred to herein, Layer 2 may comprise a MAC layer (e.g., 620, 902), a RLC layer (e.g., 630, 903), and a PDCP layer (e.g., 640, 904). As referred to herein, Layer 1 may comprise a PHY layer (e.g., 610, 901) of a UE/RAN node. Accordingly, in various examples, applicable means for transmitting may be embodied by such devices or media.

Figure 8:
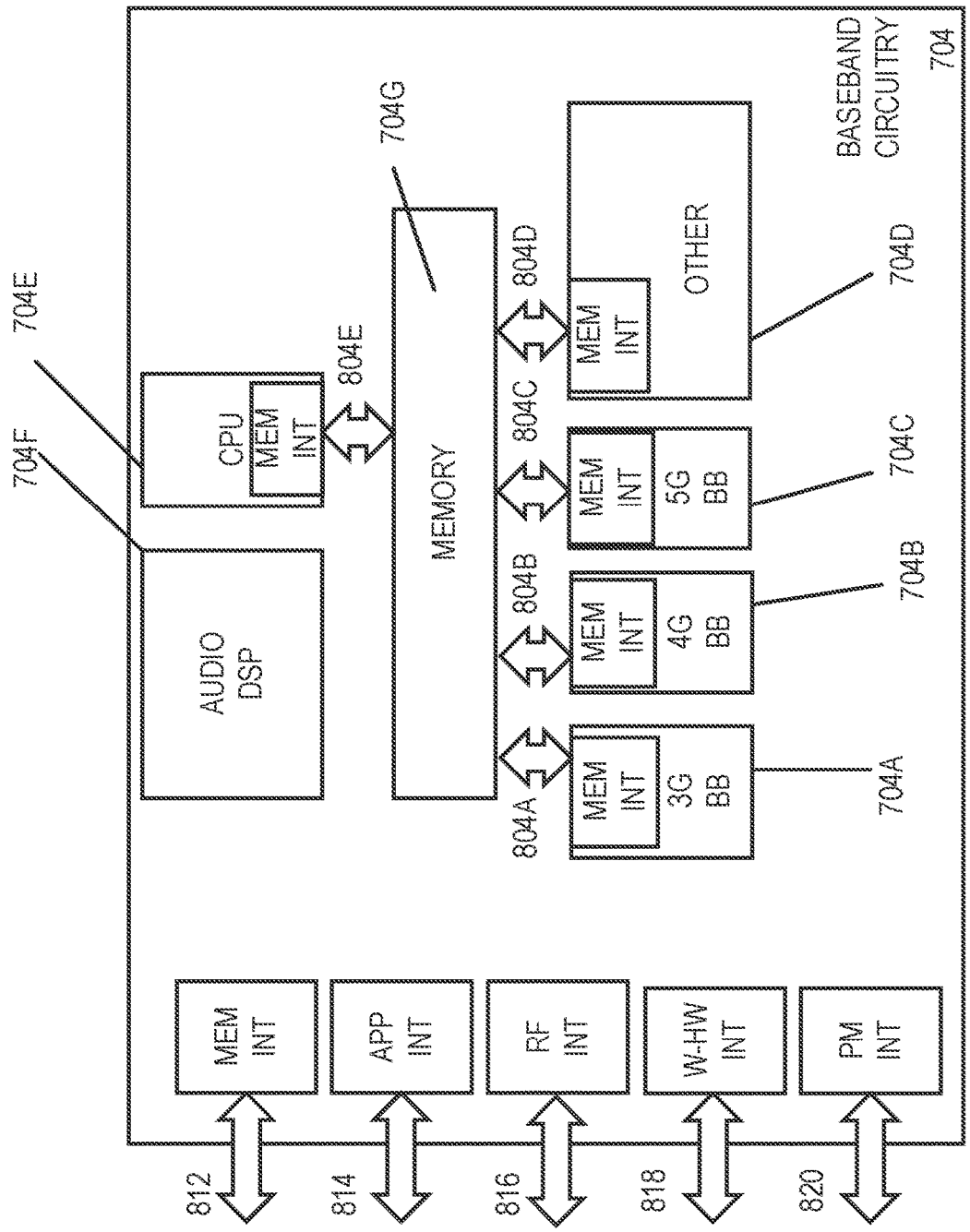
FIG. 8 illustrates example interfaces of baseband circuitry in accordance with some aspects.

FIG. 8 illustrates example interfaces of baseband circuitry in accordance with some aspects. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712).

FIG. 9 is an illustration of a control plane protocol stack in accordance with some aspects. In an aspect, a control plane 900 is shown as a communications protocol stack between the UE 401/403, the RAN node 443 (or alternatively, the RAN node 445), and the AMF 447. The PHY layer 901 may in some aspects transmit or receive information used by the MAC layer 902 over one or more air interfaces. The PHY layer 901 may further perform link adaptation or adaptive modulation and coding (AMC), power control, cell search (e.g., for initial synchronization and handover purposes), and other measurements used by higher layers, such as the RRC layer 905. The PHY layer 901 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 902 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 903 may in some aspects operate in a plurality of modes of operation, including: Transparent Mode (TM), Unacknowledged Mode (UM), and Acknowledged Mode (AM). The RLC layer 903 may execute transfer of upper layer protocol data units (PDUs), error correction through automatic repeat request (ARQ) for AM data transfers, and segmentation and reassembly of RLC SDUs for UM and AM data transfers. The RLC layer 903 may also maintain sequence numbers independent of the ones in PDCP for UM and AM data transfers. The RLC layer 903 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 904 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 905 may include broadcast of system information (e.g., included in Master Information Blocks (MIBs) or System Information Blocks (SIBs) related to the non-access stratum (NAS)); broadcast of system information related to the access stratum (AS); paging initiated by 5GC 420 or NG-RAN 439/436, establishment, maintenance, and release of an RRC connection between the UE and NG-RAN (e.g., RRC connection paging, RRC connection establishment, RRC connection addition, RRC connection modification, and RRC connection release, also for carrier aggregation (CA) and Dual Connectivity (DC) in NR or between E-UTRA and NR); establishment, configuration, maintenance, and release of Signaling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. The MIBs and SIBs may comprise one or more information elements (IEs), which may each comprise individual data fields or data structures. The RRC layer 905 may also, in some aspects, execute QoS management functions, detection of and recovery from radio link failure, and NAS message transfer between the NAS 906 in the UE and the NAS 906 in the AMF 432.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
| --- | --- | --- | --- |
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 401 and the RAN node 443/445 may utilize an NG radio interface (e.g., an LTE-Uu interface or an NR radio interface) to exchange control plane data via a protocol stack comprising the PHY layer 901, the MAC layer 902, the RLC layer 903, the PDCP layer 904, and the RRC layer 905.

The non-access stratum (NAS) protocols 906 form the highest stratum of the control plane between the UE 401 and the AMF 447 as illustrated in FIG. 9 In aspects, the NAS protocols 906 support the mobility of the UE 401 and the session management procedures to establish and maintain IP connectivity between the UE 401 and the UPF 449. In some aspects, the UE protocol stack can include one or more upper layers, above the NAS layer 906. For example, the upper layers can include an operating system layer 924, a connection manager 920, and application layer 922. In some aspects, the application layer 922 can include one or more clients which can be used to perform various application functionalities, including providing an interface for and communicating with one or more outside networks. In some aspects, the application layer 922 can include an IP multimedia subsystem (IMS) client 926.

The NG Application Protocol (NG-AP) layer 915 may support the functions of the N2 and N3 interface and comprise Elementary Procedures (EPs). An EP is a unit of interaction between the RAN node 443/445 and the 5GC 420. In certain aspects, the NG-AP layer 915 services may comprise two groups: UE-associated services and non-UE-associated services. These services perform functions including, but not limited to: UE context management, PDU session management and management of corresponding NG-RAN resources (e.g. Data Radio Bearers (DRBs)), UE capability indication, mobility, NAS signaling transport, and configuration transfer (e.g. for the transfer of Self-Organizing Network (SON) information).

The Stream Control Transmission Protocol (SCTP) layer (which may alternatively be referred to as the SCTP/IP layer) 914 may ensure reliable delivery of signaling messages between the RAN node 443/445 and the AMF 447 based, in part, on the IP protocol, supported by the IP layer 913. The L2 layer 912 and the L1 layer 911 may refer to communication links (e.g., wired or wireless) used by the RAN node 443/445 and the AMF 447 to exchange information. The RAN node 443/445 and the AMF 447 may utilize an N2 interface to exchange control plane data via a protocol stack comprising the L1 layer 911, the L2 layer 912, the IP layer 913, the SCTP layer 914, and the S1-AP layer 915.

FIG. 10 is an illustration of a user plane protocol stack in accordance with some aspects. In this aspect, a user plane 1000 is shown as a communications protocol stack between the UE 401/403, the RAN node 443 (or alternatively, the RAN node 445), and the UPF 449. The user plane 1000 may utilize at least some of the same protocol layers as the control plane 900. For example, the UE 401/403 and the RAN node 443 may utilize an NR radio interface to exchange user plane data via a protocol stack comprising the PHY layer 901, the MAC layer 902, the RLC layer 903, the PDCP layer 904, and the Service Data Adaptation Protocol (SDAP) layer 916. The SDAP layer 916 may, in some aspects, execute a mapping between a Quality of Service (QoS) flow and a data radio bearer (DRB) and a marking of both DL and UL packets with a QoS flow ID (QFI). In some aspects, an IP protocol stack 1013 can be located above the SDAP 916. A user datagram protocol (UDP)/transmission control protocol (TCP) stack 1020 can be located above the IP stack 1013. A session initiation protocol (SIP) stack 1022 can be located above the UDP/TCP stack 1020, and can be used by the UE 401/403 and the UPF 449.

The General Packet Radio Service (GPRS) Tunneling Protocol for the user plane (GTP-U) layer 1004 may be used for carrying user data within the 5G core network 420 and between the RAN (e.g., 410-J) and the 5G core network 420. The user data transported can be packets in IPv4, IPv6, or PPP formats, for example. The UDP and IP security (UDP/IP) layer 1003 may provide checksums for data integrity, port numbers for addressing different functions at the source and destination, and encryption and authentication on the selected data flows. The RAN node 443/445 and the UPF 449 may utilize an N3 interface to exchange user plane data via a protocol stack comprising the L1 layer 911, the L2 layer 912, the UDP/IP layer 1003, and the GTP-U layer 1004. As discussed above with respect to FIG. 8, NAS protocols support the mobility of the UE 401 and the session management procedures to establish and maintain IP connectivity between the UE 401 and the UPF 449.

Figure 11:
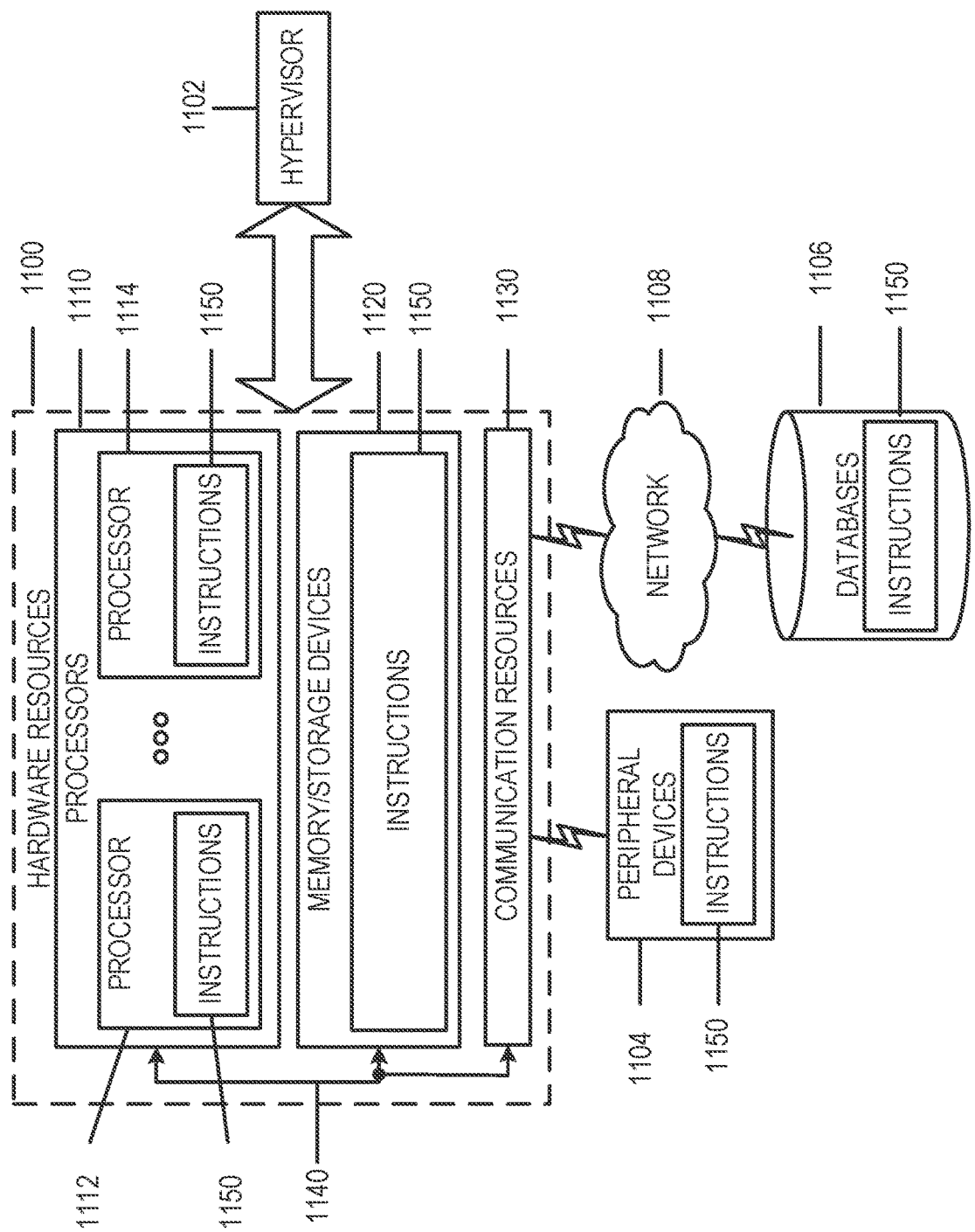
FIG. 11 is a block diagram illustrating components, according to some example aspects, able to read instructions from a machine-readable or computer-readable medium (e.g., a non-transitory machine-readable storage medium) and perform any one or more of the methodologies discussed herein.

FIG. 11 is a block diagram illustrating components, according to some example aspects, able to read instructions from a machine-readable or computer-readable medium (e.g., a non-transitory machine-readable storage medium) and perform any one or more of the methodologies discussed herein, for example, SDN data re-direction operations. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For aspects in which node virtualization (e.g., NFV) is utilized, a hypervisor 1102 may be executed to provide an execution environment for one or more network slices or sub-slices to utilize the hardware resources 1100

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media. Accordingly, in various examples, applicable means for storing may be embodied by such devices or media.

Figure 12:
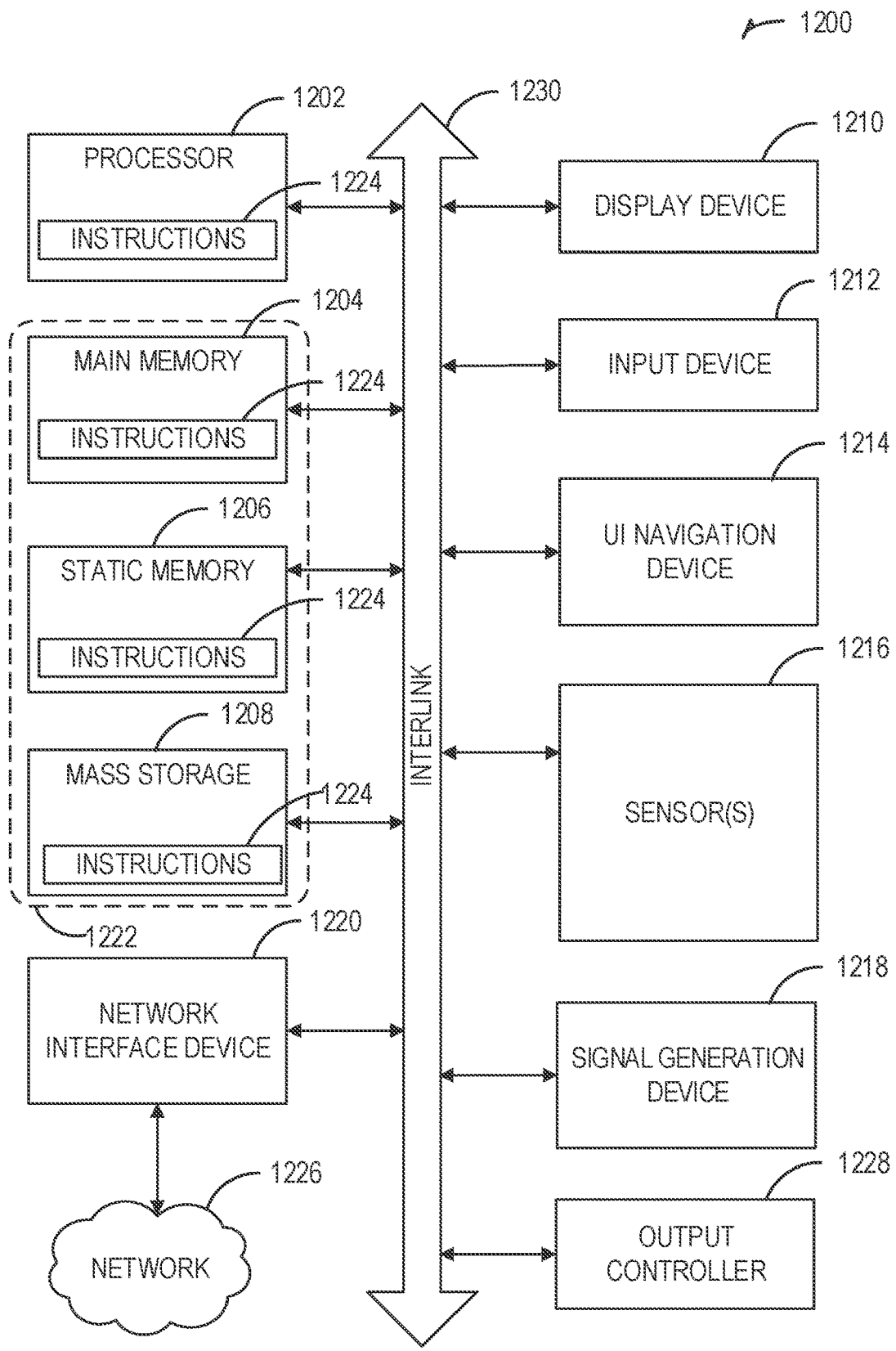
FIG. 12 illustrates a block diagram of an example computing machine, in accordance with some aspects.

FIG. 12 illustrates a block diagram of an example machine 1200 upon which any one or more of the techniques (e.g., methodologies) discussed herein may be performed, for example, SDN data re-direction operations. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow. Accordingly, in various examples, applicable means for processing (e.g., receiving, decoding, updating, configuring, transmitting, modifying, etc.) may be embodied by such processing circuitry.

In alternative aspects, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine-readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

Figure 13:
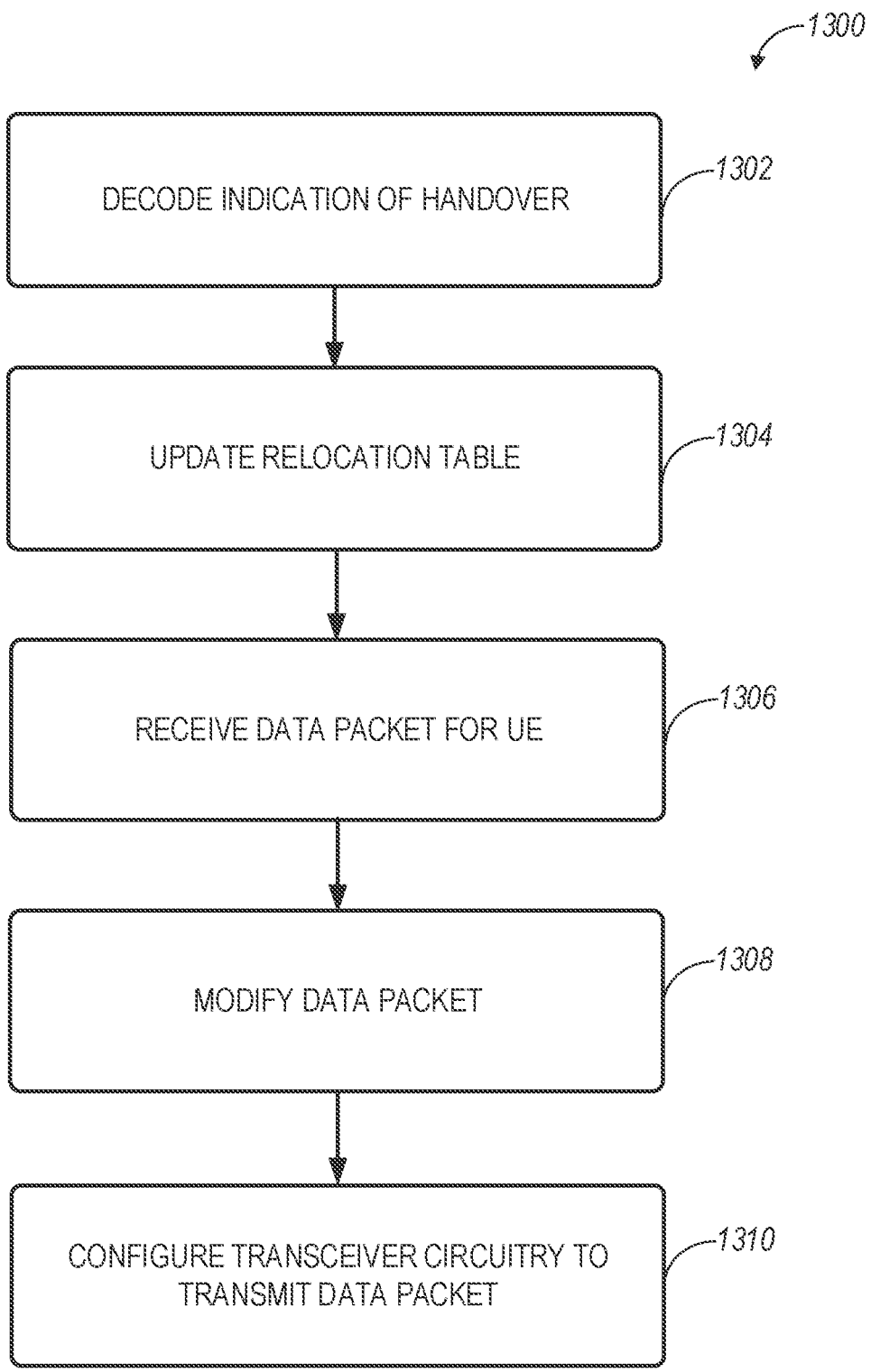
FIG. 13 illustrates generally a flow of an exemplary method of data redirection, in accordance with some aspects.

FIG. 13 illustrates generally a flow of an exemplary method 1300 of data redirection, in accordance with some aspects. It is important to note that aspects of the method 1300 may include additional or even fewer operations or processes in comparison to what is illustrated in FIG. 13. In addition, aspects of the method 1300 are not necessarily limited to the chronological order that is shown in FIG. 13. In describing the method 1300, reference may be made to FIGS. 1-12, although it is understood that the method 1300 may be practiced with any other suitable systems, interfaces and components. For example, reference may be made to systems 100, 300, or 400A-400J described earlier for illustrative purposes, but the techniques and operations of the method 1300 are not so limited. In some aspects, operations of the method 1300 can be performed by a device (e.g., apparatus of the device) such as a network router or switch, or any other network device as described herein. Further, operations can be performed by virtualized functions of the SDN or NFV networks described herein.

In operation 1302, a device decodes an indication of a handover of a UE from a first base station (BS) to a second BS, and the indication can include a UE identifier. In some aspects, the indication of the handover further includes at least one of the identifier of the first BS or the identifier of the second BS. In some aspects, the device receives and decodes handover prediction information (e.g., from a network entity, RAN node, a link quality prediction (LQP) server, or the UE), and the handover prediction information can include an indication of a predicted future geographic location of the UE. The handover prediction information may be information included in the indication of the handover or can be received and decoded separately from the indication of the handover. The indication of the handover can be transmitted from a RAN node, such as a BS, a network entity such as an MME or AMF, or the UE. In some aspects, the handover prediction information can include one or more indications of a bandwidth parameter, a latency parameter, a transmission power parameter, or a bit-error-rate parameter, associated with the UE.

In operation 1304, the device updates a relocation table, for example an SDN relocation table, and the relocation table can be stored in the device memory or in the SDN domain or NFV domain. The device can update the relocation table based on the indication, wherein the relocation table is configured to include the UE identifier, an identifier of the first BS, and an identifier of the second BS. In some aspects, the device can discard the relocation table or information in the relocation table, for example, at least one of the UE identifier, the identifier of the first BS, or the identifier of the second BS. The device can discard such information, for example, after a threshold period as described above. For example, the threshold period can be an expiration time, and the handover prediction information can include an indication of the expiration time. In some aspects, the device can overwrite information in the relocation table, for example, at least one of the UE identifier, the identifier of the first BS, or the identifier of the second BS after the expiration time elapses. In some aspects, the device updates the relocation table, based on the indication, to override a routing policy previously configured by a network controller (e.g., virtualized network controller).

In operation 1306, the device receives (e.g., configures transceiver circuitry to receive) a data packet for the UE, and the data packet can be configured for transmission to the first BS and may include the UE identifier. In some aspects, the device may receive the data packet from a source such as a data center, although aspects are not so limited. For example, the device may receive data packets from a local or regional CDN, or a data source that is part of an edge services network (e.g., edge server).

In operation 1308, the device can modify the data packet, based on the relocation table (e.g., updated relocation table), for rerouting to the second BS. This way, the data packet will still reach the UE even if the UE has been handed off to the second BS or is about to be handed off to the second BS and is therefore no longer located at the first BS or will not be at the first BS by the time the data packet were to arrive at the first BS.

In operation 1310, the device can transmit (e.g., configure transceiver circuitry to transmit) the modified data packet to the second BS, which the UE would be located at by the time the packet arrives. In some aspects, for example, in cases of high priority data transmissions, the device can transmit (e.g., configure the transceiver circuitry to transmit) the data packet to the first BS and the second BS. This may be done if there is uncertainty as to where the UE will be located at the time of arrival of the data packet. In some aspects, the device transmits the data packet to a second network router or switch, and the second router may then transmit the data packet to the second BS or another node in the network to ultimately reach the second BS.

Any of the radio links described herein may operate according to any one or more of the following exemplary radio communication technologies or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.1 lad, IEEE 802.1 lay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a network router, the apparatus comprising: memory; and processing circuitry configured to: decode an indication of a handover of a user equipment (UE) from a first end point (EP) to a second EP, the indication including a UE identifier; update a relocation table stored in the memory, based on the indication, wherein the relocation table is configured to include, the UE identifier, an identifier of the first EP, and an identifier of the second EP; configure transceiver circuitry to receive a data packet for the UE, wherein the data packet is configured for transmission to the first EP and includes the UE identifier; modify the data packet, based on the relocation table, for rerouting to the second EP; and configure the transceiver circuitry to transmit the modified data packet.

In Example 2, the subject matter of Example 1 includes, wherein the indication of the handover further includes at least one of the identifier of the first EP or the identifier of the second EP.

In Example 3, the subject matter of Example 2 includes, wherein the processing circuitry is configured to: decode handover prediction information including an indication of a predicted future geographic location of the UE; and update the relocation table based on the handover prediction information.

In Example 4, the subject matter of Example 3 includes, wherein the processing circuitry is arranged to configure the transceiver circuitry to receive the handover prediction information from a network entity or the UE, wherein the network entity is one of a link quality prediction (LQP) server or a radio access network (RAN) node.

In Example 5, the subject matter of Examples 3-4 includes, wherein the handover prediction information further includes one or more indications of a bandwidth parameter, a latency parameter, a transmission power parameter, or a bit-error-rate parameter, associated with the UE.

In Example 6, the subject matter of Examples 3-5 includes, wherein the processing circuitry is configured to discard at least one of the UE identifier, the identifier of the first EP, or the identifier of the second EP from the relocation table after a threshold period.

In Example 7, the subject matter of Example 6 includes, wherein the threshold period is an expiration time, wherein the handover prediction information includes an indication of the expiration time, and wherein the processing circuitry is configured to overwrite at least one of the UE identifier, the identifier of the first EP, or the identifier of the second EP after the expiration time elapses.

In Example 8, the subject matter of Examples 1-7 includes, wherein the processing circuitry is configured to update the relocation table, based on the indication, to override a routing policy previously configured by a network controller.

In Example 9, the subject matter of Example 8 includes, wherein the network router is a function within a data plane of a software-defined networking (SDN) system; and wherein the relocation table is an SDN relocation table stored in memory of the SDN system.

In Example 10, the subject matter of Example 9 includes, wherein the network controller is a function within a control plane of the SDN system.

In Example 11, the subject matter of Example 10 includes, wherein at least one of the network router or the network controller are virtualized network functions (VNFs).

In Example 12, the subject matter of Examples 8-11 includes, wherein the network router is a function of a virtualized processing node of a network function virtualization (NFV) system.

In Example 13, the subject matter of Example 12 includes, wherein the network controller is a function of a virtualized processing node of the NFV system.

In Example 14, the subject matter of Examples 1-13 includes, wherein the processing circuitry is adapted to configure the transceiver circuitry to transmit the modified data packet to the second EP.

In Example 15, the subject matter of Example 14 includes, wherein the processing circuitry is adapted to: configure the transceiver circuitry to transmit the data packet to the first EP; and configure the transceiver circuitry to transmit the modified data packet to the second EP.

In Example 16, the subject matter of Examples 14-15 includes, wherein the processing circuitry is adapted to configure the transceiver circuitry to transmit the modified data packet to a second network router.

In Example 17, the subject matter of Examples 1-16 includes, wherein the apparatus further comprises an antenna and a transceiver, the antenna and the transceiver configured to receive the data packet and transmit the modified data packet.

In Example 18, the subject matter of Examples 1-17 includes, wherein the processing circuitry is a baseband processor.

Example 19 is a non-transitory computer-readable hardware storage device that stores instructions for execution by one or more processors of a network router, the instructions to configure the one or more processors to: decode an indication of a handover of a user equipment (UE) from a first end point (EP) to a second EP, the indication including at least one of a UE identifier, an identifier of the first EP or an identifier of the second EP; update a software-defined networking (SDN) relocation table, based on the indication, wherein the SDN relocation table is configured to store the UE identifier, the identifier of the first EP, and the identifier of the second EP; decode a data packet for the UE, wherein the data packet is configured for transmission to the first EP and includes, the UE identifier; modify the data packet, based on the SDN relocation table, for rerouting to the second EP; and configure transceiver circuitry to transmit the modified data packet.

In Example 20, the subject matter of Example 19 includes, wherein the instructions are to configure the one or more processors to: decode handover prediction information the handover prediction information including an indication of a predicted future geographic location of the UE; and update the SDN relocation table based on the handover prediction information.

In Example 21, the subject matter of Example 20 includes, wherein the handover prediction information further includes one or more indications of a bandwidth parameter, a latency parameter, a transmission power parameter, or a bit-error-rate parameter, associated with the UE.

In Example 22, the subject matter of Examples 20-21 includes, wherein the instructions are to configure the one or more processors to discard at least one of the UE identifier, the identifier of the first EP, or the identifier of the second EP from the SDN relocation table after a threshold period.

In Example 23, the subject matter of Examples 20-22 includes, wherein the instructions are to configure the one or more processors to configure the transceiver circuitry to transmit the modified data packet to one of the second EP or a second router.

Example 24 is an apparatus of a network entity, the apparatus comprising: memory: and processing circuitry configured to: encode handover prediction information for an update of a software-defined networking (SDN) relocation table stored at a network router, wherein the handover prediction information includes, one or more indications of a predicted future geographic location, a bandwidth parameter, a latency parameter, a transmission power parameter, or a bit-error-rate parameter, associated with a user equipment (UE); configure transceiver circuitry to transmit the handover prediction information to the network router, and wherein the memory is configured to store the handover prediction information.

In Example 25, the subject matter of Examples 24 includes, wherein the network entity is one of a link quality prediction (LQP) server or a radio access network (RAN) node.

Example 26 is a method of data re-direction, the method comprising: decoding an indication of a handover of a user equipment (UE) from a first end point (EP) to a second EP, the indication including a UE identifier; updating a relocation table stored in the memory, based on the indication, wherein the relocation table is configured to include, the UE identifier, an identifier of the first EP, and an identifier of the second EP; configuring transceiver circuitry to receive a data packet for the UE, wherein the data packet is configured for transmission to the first EP and includes the UE identifier; modifying the data packet, based on the relocation table, for rerouting to the second EP; and configure the transceiver circuitry to transmit the modified data packet.

In Example 27, the subject matter of Example 26 includes, wherein the indication of the handover further includes at least one of the identifier of the first EP or the identifier of the second EP.

In Example 28, the subject matter of Example 27 includes, decoding handover prediction information including an indication of a predicted future geographic location of the UE; and updating the relocation table based on the handover prediction information.

In Example 29, the subject matter of Example 28 includes, configuring the transceiver circuitry to receive the handover prediction information from a network entity or the UE, wherein the network entity is one of a link quality prediction (LQP) server or a radio access network (RAN) node.

In Example 30, the subject matter of Examples 28-29 includes, wherein the handover prediction information further includes one or more indications of a bandwidth parameter, a latency parameter, a transmission power parameter, or a bit-error-rate parameter, associated with the UE.

In Example 31, the subject matter of Examples 28-30 includes, discarding at least one of the UE identifier, the identifier of the first EP, or the identifier of the second EP from the relocation table after a threshold period.

In Example 32, the subject matter of Example 31 includes, overwriting at least one of the UE identifier, the identifier of the first EP, or the identifier of the second EP after the expiration time elapses, wherein the threshold period is an expiration time, and wherein the handover prediction information includes an indication of the expiration time.

In Example 33, the subject matter of Examples 26-32 includes, updating the relocation table, based on the indication, to override a routing policy previously configured by a network controller.

In Example 34, the subject matter of Example 33 includes, wherein the network router is a function within a data plane of a software-defined networking (SDN) system; and wherein the relocation table is an SDN relocation table stored in memory of the SDN system.

In Example 35, the subject matter of Example 34 includes, wherein the network controller is a function within a control plane of the SDN system.

In Example 36, the subject matter of Example 35 includes, wherein at least one of the network router or the network controller are virtualized network functions (VNFs).

In Example 37, the subject matter of Examples 33-36 includes, wherein the network router is a function of a virtualized processing node of a network function virtualization (NFV) system.

In Example 38, the subject matter of Example 37 includes, wherein the network controller is a function of a virtualized processing node of the NFV system.

In Example 39, the subject matter of Examples 26-38 includes, configuring the transceiver circuitry to transmit the modified data packet to the second EP.

In Example 40, the subject matter of Example 39 includes, configuring the transceiver circuitry to transmit the data packet to the first EP; and configuring the transceiver circuitry to transmit the modified data packet to the second EP.

In Example 41, the subject matter of Examples 39-40 includes, configuring the transceiver circuitry to transmit the modified data packet to a second network router.

In Example 42, the subject matter of Examples 26-41 includes, configuring an antenna and a transceiver to receive the data packet and transmit the modified data packet.

Example 43 is a method of data re-direction, the method comprising: encoding handover prediction information for an update of a software-defined networking (SDN) relocation table stored at a network router, wherein the handover prediction information includes, one or more indications of a predicted future geographic location, a bandwidth parameter, a latency parameter, a transmission power parameter, or a bit-error-rate parameter, associated with a user equipment (UE); and configuring transceiver circuitry to transmit the handover prediction information to the network router.

Example 44 is an apparatus of a network router, the apparatus comprising: means for decoding an indication of a handover of a user equipment (UE) from a first end point (EP) to a second EP, the indication including a UE identifier; means for updating a relocation table stored in the memory, based on the indication, wherein the relocation table is configured to include, the UE identifier, an identifier of the first EP, and an identifier of the second EP; means for configuring transceiver circuitry to receive a data packet for the UE, wherein the data packet is configured for transmission to the first EP and includes the UE identifier; means for modifying the data packet, based on the relocation table, for rerouting to the second EP; means for configure the transceiver circuitry to transmit the modified data packet; and means for storing the indication of the handover.

In Example 45, the subject matter of Example 44 includes, wherein the indication of the handover further includes at least one of the identifier of the first EP or the identifier of the second EP.

In Example 46, the subject matter of Example 45 includes, means for decoding handover prediction information including an indication of a predicted future geographic location of the UE; and means for updating the relocation table based on the handover prediction information.

In Example 47, the subject matter of Example 46 includes, means for configuring the transceiver circuitry to receive the handover prediction information from a network entity or the UE, wherein the network entity is one of a link quality prediction (LQP) server or a radio access network (RAN) node.

In Example 48, the subject matter of Examples 46-47 includes, wherein the handover prediction information further includes one or more indications of a bandwidth parameter, a latency parameter, a transmission power parameter, or a bit-error-rate parameter, associated with the UE.

In Example 49, the subject matter of Examples 46-48 includes, means for discarding at least one of the UE identifier, the identifier of the first EP, or the identifier of the second EP from the relocation table after a threshold period.

In Example 50, the subject matter of Example 49 includes, means for overwriting at least one of the UE identifier, the identifier of the first EP, or the identifier of the second EP after the expiration time elapses, wherein the threshold period is an expiration time, and wherein the handover prediction information includes an indication of the expiration time.

In Example 51, the subject matter of Examples 44-50 includes, means for updating the relocation table, based on the indication, to override a routing policy previously configured by a network controller.

In Example 52, the subject matter of Example 51 includes, wherein the network router is a function within a data plane of a software-defined networking (SDN) system; and wherein the relocation table is an SDN relocation table stored in memory of the SDN system.

In Example 53, the subject matter of Example 52 includes, wherein the network controller is a function within a control plane of the SDN system.

In Example 54, the subject matter of Example 53 includes, wherein at least one of the network router or the network controller are virtualized network functions (VNFs).

In Example 55, the subject matter of Examples 51-54 includes, wherein the network router is a function of a virtualized processing node of a network function virtualization (NFV) system.

In Example 56, the subject matter of Example 55 includes, wherein the network controller is a function of a virtualized processing node of the NFV system.

In Example 57, the subject matter of Examples 44-56 includes, means for configuring the transceiver circuitry to transmit the modified data packet to the second EP.

In Example 58, the subject matter of Example 57 includes, means for configuring the transceiver circuitry to transmit the data packet to the first EP; and means for configuring the transceiver circuitry to transmit the modified data packet to the second EP.

In Example 59, the subject matter of Examples 57-58 includes, means for configuring the transceiver circuitry to transmit the modified data packet to a second network router.

In Example 60, the subject matter of Examples 44-59 includes, means for configuring an antenna and a transceiver to receive the data packet and transmit the modified data packet.

Example 61 is an apparatus of a network entity, the apparatus comprising: means for encoding handover prediction information for an update of a software-defined networking (SDN) relocation table stored at a network router, wherein the handover prediction information includes, one or more indications of a predicted future geographic location, a bandwidth parameter, a latency parameter, a transmission power parameter, or a bit-error-rate parameter, associated with a user equipment (UE); and means for configuring transceiver circuitry to transmit the handover prediction information to the network router.

Example 62 is an apparatus of a network switch, the apparatus comprising: memory; and processing circuitry configured to: decode an indication of a handover of a user equipment (UE) from a first end point (EP) to a second EP, the indication including a UE identifier; update a relocation table stored in the memory, based on the indication, wherein the relocation table is configured to include, the UE identifier, an identifier of the first EP, and an identifier of the second EP; configure transceiver circuitry to receive a data packet for the UE, wherein the data packet is configured for transmission to the first EP and includes the UE identifier; modify the data packet, based on the relocation table, for rerouting to the second EP; and configure the transceiver circuitry to transmit the modified data packet.

In Example 63, the subject matter of Example 62 includes, wherein the indication of the handover further includes at least one of the identifier of the first EP or the identifier of the second EP.

In Example 64, the subject matter of Example 63 includes, wherein the processing circuitry is configured to:

decode handover prediction information including an indication of a predicted future geographic location of the UE; and update the relocation table based on the handover prediction information.

In Example 65, the subject matter of Example 64 includes, wherein the processing circuitry is arranged to configure the transceiver circuitry to receive the handover prediction information from a network entity or the UE, wherein the network entity is one of a link quality prediction (LQP) server or a radio access network (RAN) node.

In Example 66, the subject matter of Examples 64-65 includes, wherein the handover prediction information further includes one or more indications of a bandwidth parameter, a latency parameter, a transmission power parameter, or a bit-error-rate parameter, associated with the UE.

In Example 67, the subject matter of Examples 64-66 includes, wherein the processing circuitry is configured to discard at least one of the UE identifier, the identifier of the first EP, or the identifier of the second EP from the relocation table after a threshold period.

In Example 68, the subject matter of Example 67 includes, wherein the threshold period is an expiration time, wherein the handover prediction information includes an indication of the expiration time, and wherein the processing circuitry is configured to overwrite at least one of the UE identifier, the identifier of the first EP, or the identifier of the second EP after the expiration time elapses.

In Example 69, the subject matter of Examples 62-68 includes, wherein the processing circuitry is configured to update the relocation table, based on the indication, to override a routing policy previously configured by a network controller.

In Example 70, the subject matter of Example 69 includes, wherein the network switch is a function within a data plane of a software-defined networking (SDN) system; and wherein the relocation table is an SDN relocation table stored in memory of the SDN system.

In Example 71, the subject matter of Example 70 includes, wherein the network controller is a function within a control plane of the SDN system.

In Example 72, the subject matter of Example 71 includes, wherein at least one of the network switch or the network controller are virtualized network functions (VNFs).

In Example 73, the subject matter of Examples 69-72 includes, wherein the network switch is a function of a virtualized processing node of a network function virtualization (NFV) system.

In Example 74, the subject matter of Example 73 includes, wherein the network controller is a function of a virtualized processing node of the NFV system.

In Example 75, the subject matter of Examples 62-74 includes, wherein the processing circuitry is adapted to configure the transceiver circuitry to transmit the modified data packet to the second EP.

In Example 76, the subject matter of Example 75 includes, wherein the processing circuitry is adapted to: configure the transceiver circuitry to transmit the data packet to the first EP; and configure the transceiver circuitry to transmit the modified data packet to the second EP.

In Example 77, the subject matter of Examples 75-76 includes, wherein the processing circuitry is adapted to configure the transceiver circuitry to transmit the modified data packet to a second network switch.

In Example 78, the subject matter of Examples 62-77 includes, wherein the apparatus further comprises an antenna and a transceiver, the antenna and the transceiver configured to receive the data packet and transmit the modified data packet.

In Example 79, the subject matter of Examples 62-78 includes, wherein the processing circuitry is a baseband processor.

Example 80 is at least one machine-readable medium including instructions that, when executed by processing circuitry, cause the processing circuitry to perform operations to implement of any of Examples 1-79.

Example 81 is a software defined networking (SDN) system including one or more virtualized functions adapted to perform any of the operations of Examples 1 to 80.

Example 82 is a network function virtualization (NFV) system having virtualized processing nodes adapted to perform any of the operations of Examples 1 to 80.

Example 83 is an Internet of Things (IoT) network topology, the IoT network topology comprising respective communication links adapted to perform communications for the operations of any of Examples 1 to 80.

Example 84 is a network comprising respective devices and device communication mediums for performing any of the operations of Examples 1 to 80.

Example 85 is an edge cloud computing device implementation comprising processing nodes and computing units adapted for performing any of the operations of Examples 1 to 80.

Example 86 is an edge cloud network platform comprising physical and logical computing resources adapted for performing any of the operations of Examples 1 to 80.

Example 87 is a network routing apparatus, a network router, a network switch, or an application within a network router or a network switch adapted to perform any of the operations of Examples 1-80.

Example 88 is at least one machine-readable medium of an edge cloud computing device, including instructions that, when executed by processing circuitry, cause the processing circuitry to perform operations to implement of any of Examples 1-87.

Example 89 is an apparatus comprising means for performing any of the operations of Examples 1 to 80.

Example 90 is a system to perform the operations of any of Examples 1 to 80.

Example 91 is a method to implement of any of Examples 1-80.

What is claimed is:

1. A computing node comprising:
   a network interface card (NIC); and
   processing circuitry coupled to the NIC, the processing circuitry configured to:
      detect an upcoming handover of a user equipment (UE) from a first base station to a second base station based on a handover indicator originating at the first base station, the handover indicator received from the first base station via the NIC;
      decode a data packet received via the NIC, the data packet configured for transmission to the first base station;
      modify the data packet to include an identifier of the second base station based on the handover indicator from the first base station, for rerouting to the second base station; and
      encode the modified data packet for transmission to the second base station via the NIC, the transmission using the identifier of the second base station.

2. The computing node of claim 1, wherein the handover indicator comprises an identifier of the first base station and the identifier of the second base station.

3. The computing node of claim 2, wherein the processing circuitry is configured to:
store the identifier of the first base station and the identifier of the second base station in a data structure associated with the computing node; and
retrieve the identifier of the second base station from the data structure prior to the transmission.

4. The computing node of claim 1, further comprising memory coupled to the processing circuitry, wherein the processing circuitry is configured to:
update a data record stored in the memory, based on the handover indication, the data record including an identifier of the UE, an identifier of the first base station, and an identifier of the second base station; and
modify the data packet, based on the data record, for rerouting to the second base station.

5. The computing node of claim 4, wherein the processing circuitry is configured to:
decode handover prediction information including an indication of a predicted future geographic location of the UE; and
update the data record based on the handover prediction information.

6. The computing node of claim 5, wherein the handover prediction information originates from a network entity or the UE, wherein the network entity is one of a link quality prediction (LQP) server or a radio access network (RAN) node.

7. The computing node of claim 5, wherein the handover prediction information further includes one or more indications of a bandwidth parameter, a latency parameter, a transmission power parameter, or a bit-error-rate parameter, associated with the UE.

8. The computing node of claim 5, wherein the processing circuitry is configured to: discard at least one of the identifier of the UE identifier, the identifier of the first base station, and the identifier of the second base station from the data record after a threshold period.

9. The computing node of claim 8, wherein the threshold period is an expiration time, wherein the handover prediction information includes an indication of the expiration time, and wherein the processing circuitry is configured to:
overwrite at least one of the UE identifier, the identifier of the first base station, or the identifier of the second base station after the expiration time elapses.

10. The computing node of claim 4, wherein the processing circuitry is configured to:
update the data record, based on the handover indicator, to override a routing policy previously configured by a network controller,
wherein the network controller is a function within a control plane of a software-defined networking (SDN) system.

11. The computing node of claim 4, wherein the data record further comprises a link quality prediction for a communication link associated with the UE.

12. A non-transitory computer-readable storage device that stores instructions for execution by one or more processors of a computing node, the instructions to configure the one or more processors to:
detect an upcoming handover of a user equipment (UE) from a first base station to a second base station based on a handover indicator originating at the first base station, the handover indicator received from the first base station via a network interface card (NIC);
decode a data packet received via the NIC, the data packet configured for transmission to the first base station;
modify the data packet to include an identifier of the second base station based on the handover indicator from the first base station, for rerouting to the second base station; and
encode the modified data packet for transmission to the second base station via the NIC, the transmission using the identifier of the second base station.

13. The non-transitory computer-readable storage device of claim 12, wherein the handover indicator comprises an identifier of the first base station and the identifier of the second base station, and wherein the instructions to configure the one or more processors to:
store the identifier of the first base station and the identifier of the second base station in a data structure associated with the computing node; and
retrieve the identifier of the second base station from the data structure prior to the transmission.

14. The non-transitory computer-readable storage device of claim 12, wherein the instructions to configure the one or more processors to:
update a data record based on the handover indication, the data record including an identifier of the UE, an identifier of the first base station, and an identifier of the second base station; and
modify the data packet, based on the data record, for rerouting to the second base station.

15. The non-transitory computer-readable storage device of claim 14, wherein the instructions to configure the one or more processors to:
decode handover prediction information including an indication of a predicted future geographic location of the UE; and
update the data record based on the handover prediction information.

16. The non-transitory computer-readable storage device of claim 15, wherein the handover prediction information originates from a network entity or the UE, wherein the network entity is one of a link quality prediction (LQP) server or a radio access network (RAN) node.

17. The non-transitory computer-readable storage device of claim 15, wherein the handover prediction information further includes one or more indications of a bandwidth parameter, a latency parameter, a transmission power parameter, or a bit-error-rate parameter, associated with the UE.

18. The non-transitory computer-readable storage device of claim 15, wherein the instructions to configure the one or more processors to:
discard at least one of the identifier of the UE identifier, the identifier of the first base station, and the identifier of the second base station from the data record after a threshold period.

19. The non-transitory computer-readable storage device of claim 18, wherein the threshold period is an expiration time, wherein the handover prediction information includes an indication of the expiration time, and wherein the instructions to configure the one or more processors to:
overwrite at least one of the UE identifier, the identifier of the first base station, or the identifier of the second base station after the expiration time elapses.

20. An apparatus comprising:
means for detecting an upcoming handover of a user equipment (UE) from a first base station to a second base station based on a handover indicator originating at the first base station, the handover indicator received from the first base station via a network interface card (NIC);

means for decoding a data packet received via the NIC, the data packet configured for transmission to the first base station;

means for modifying the data packet to include an identifier of the second base station based on the handover indicator from the first base station, for rerouting to the second base station; and means for encoding the modified data packet for transmission to the second base station via the NIC, the transmission using the identifier of the second base station.

21. The apparatus of claim 20, wherein the handover indicator comprises an identifier of the first base station and the identifier of the second base station, and wherein the apparatus further comprises:

means for storing the identifier of the first base station and the identifier of the second base station in a data structure associated with the apparatus; and means for retrieving the identifier of the second base station from the data structure prior to the transmission.

\* \* \* \* \*